(12) United States Patent
Katakura

(10) Patent No.: US 7,764,444 B2
(45) Date of Patent: Jul. 27, 2010

(54) THREE-UNIT ZOOM LENS SYSTEM AND IMAGE PICKUP APPARATUS USING THE SAME

(75) Inventor: Masahiro Katakura, Hino (JP)

(73) Assignee: Olympus Imaging Corp., Tokyo (JP)

( * ) Notice: Subject to any disclaimer, the term of this patent is extended or adjusted under 35 U.S.C. 154(b) by 92 days.

(21) Appl. No.: 12/220,866

(22) Filed: Jul. 28, 2008

(65) Prior Publication Data

US 2009/0034067 A1   Feb. 5, 2009

(30) Foreign Application Priority Data

Aug. 3, 2007   (JP)   ............................. 2007-202995

(51) Int. Cl.
*G02B 9/12*   (2006.01)
(52) U.S. Cl. ...................................... 359/784
(58) Field of Classification Search ................. 359/782, 359/784
See application file for complete search history.

(56) References Cited

U.S. PATENT DOCUMENTS 6,519,095 B1 *   2/2003   Takato ........................ 359/689

FOREIGN PATENT DOCUMENTS

JP   2006-220766   8/2006

* cited by examiner

*Primary Examiner*—Joseph Martinez
(74) *Attorney, Agent, or Firm*—Kenyon & Kenyon LLP

(57) ABSTRACT

A three-unit zoom lens system includes in order from an object side thereof, a first lens unit G1 having a negative refracting power, a second lens unit G2 having a positive refracting power, a third lens unit G3 having a positive refracting power or a negative refracting power, and an aperture stop which is on an image plane side of the first lens unit G1, and on an object side of a lens surface nearest to the image side, of the second lens unit G2, and which moves integrally with the second lens unit. At the time of zooming from the wide angle end to the telephoto end, a distance between the first lens unit G1 and the second lens unit G2 is narrowed, and a distance between the second lens unit G2 and the third lens unit G3 changes. The second lens unit G2 moves toward the object side at the time of zooming from the wide angle end to the telephoto end. The second lens unit includes a positive lens made of plastic, which is disposed nearest to the object. The three-unit zoom lens system satisfies predetermined conditional expressions.

17 Claims, 18 Drawing Sheets

THREE-UNIT ZOOM LENS SYSTEM AND IMAGE PICKUP APPARATUS USING THE SAME

CROSS-REFERENCE TO RELATED APPLICATION

The present application is based upon and claims the benefit of priority from the prior Japanese Patent Application No. 2007-202995 filed on Aug. 3, 2007; the entire content of which are incorporated herein by reference.

BACKGROUND OF THE INVENTION

1. Field of the Invention

The present invention relates to a three-unit zoom lens system of a small size, and an image pickup apparatus such as a compact digital camera in which, the three-unit zoom lens system is used.

2. Description of the Related Art

In an image pickup apparatus such as a digital camera and a video camera, a high image quality and a high magnification have been sought. Whereas, taking into consideration a manufacturing cost, sometimes, lenses are formed by plastic, replacing glass.

For instance, in Japanese Patent Application Laid-open Publication No. 2006-220766, a three-unit zoom lens system which includes a first lens unit having a negative refracting power, a second lens unit having a positive refracting power and a third lens unit, and in which, a positive lens made of plastic is used nearest to an object, in the second lens unit has been disclosed. In this zoom lens system, a point of cost is taken into consideration while securing a zooming ratio of about 2.5.

SUMMARY OF THE INVENTION

According to a first aspect of the present invention, there is provided a three-unit zoom lens system including in order from an object side thereof a first lens unit having a negative refracting power, a second lens unit having a positive refracting power, a third lens unit having a positive refracting power or a negative refracting power, and an aperture stop which is disposed at an image plane side of the first lens unit, and at an object side of a lens surface nearest to the image side, of the second lens unit, and which moves integrally with the second lens unit, and at the time of zooming from a wide angle end to a telephoto end, a distance between the first lens unit and the second lens unit is narrowed, and a distance between the second lens unit and the third lens unit changes, and the second lens unit moves toward the object side at the time of zooming from the wide angle end to the telephoto end, and the second lens unit includes a positive lens made of plastic, which is disposed nearest to the object, and the three-unit zoom lens system satisfies the following conditional expressions $$f_t/f_w > 3.6 \quad (1)$$

$$D_{L21}/D_t < 0.1 \quad (2)$$

where, $f_w$ denotes a focal length at the wide angle end, of the three-unit zoom lens system, $f_t$ denotes a focal length at the telephoto end, of the three-unit zoom lens system, $D_{L21}$ denotes an optical axial thickness of the positive lens made of plastic disposed nearest to the object in the second lens unit, and $D_t$ denotes an overall optical axial length at the wide angle end, of the three-unit zoom lens system, and the overall length is a length which is obtained by adding a back focus expressed in terms of an air conversion length, to an optical axial thickness from a surface of incidence of a lens nearest to the object up to a surface of emergence of a lens nearest to the image, of the three-unit zoom lens system.

According to a second aspect of the present invention, there is provided an image pickup apparatus which includes a three-unit zoom lens system, and an image pickup element which is disposed at an image side of the three-unit zoom lens system, and which converts an optical image formed by the three-unit zoom lens system, to an electric signal, and the three-unit zoom lens system is a zoom lens system according to the first aspect of the present invention.

BRIEF DESCRIPTION OF THE DRAWINGS

FIG. 1A shows a state at a wide angle end, FIG. 1B shows an intermediate state, and FIG. 1C shows a state at a telephoto end;

DETAILED DESCRIPTION OF THE PREFERRED EMBODIMENTS

Figure 1A:
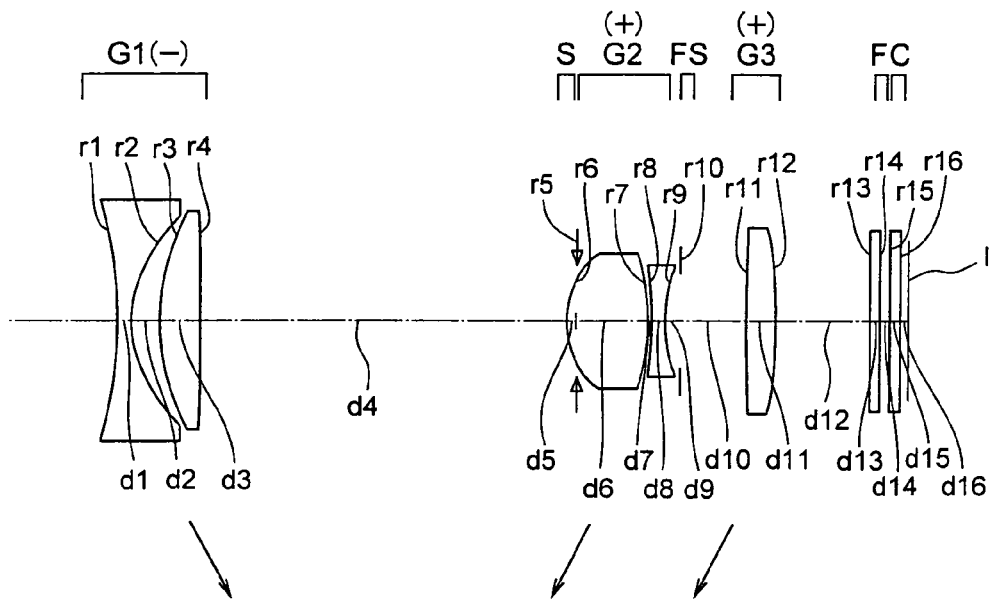
FIG. 1A, FIG. 1B, and FIG. 1C are lens cross-sectional views along an optical axis showing an optical arrangement at the time of infinite object point focusing of a first embodiment of a zoom lens system according to the present invention, where.

A three-unit zoom lens system according to a first aspect of the present invention has a basic structure which includes in order from an object side thereof, a first lens unit having a negative refracting power, a second lens unit having a positive refracting power, a third lens unit having a positive refracting power or a negative refracting power, and an aperture stop which is disposed at an image plane side of the first lens unit, and at an object side of a lens surface nearest to the image, of the second lens unit, and which moves integrally with the second lens unit, and at the time of zooming from a wide angle end to a telephoto end, a distance between the first lens unit and the second lens unit is narrowed, and a distance between the second lens unit and the third lens unit changes, and the second lens unit moves toward the object side at the time of zooming from the wide angle end to the telephoto end, and the second lens unit includes a positive lens made of plastic, which is disposed nearest to the object.

In this manner, by letting the refracting power of the first lens unit to be negative, it is advantageous for securing an image angle, making a size small in a radial direction, and reducing the number of lens units forming the zoom lens system.

A decrease in the number of lens units is also advantageous for decreasing the number of lenses. As a result, this leads to a thinning of a lens frame and a reduction in cost.

Moreover, by the second lens unit having a positive refracting power changing the distance with the first lens unit, the second lens unit functions as a variator, and a magnification is increased by moving from the object side to the image side at the time of zooming from the wide angle end to the telephoto end.

Further, by disposing the positive lens made of plastic nearest to the object in the second lens unit, it becomes easy to make small a size of the second lens unit in the radial direction, and it is advantageous from a point of cost.

Moreover, the three-unit zoom lens system according to the present invention further satisfies the following conditional expressions.

$$f_t/f_w > 3.6 \quad (1)$$

$$D_{L21}/D_t > 0.1 \quad (2)$$

where, $f_w$ denotes a focal length at the wide angle end, of the three-unit zoom lens system, $f_t$ denotes a focal length at the telephoto end, of the three-unit zoom lens system, and $D_{L21}$ denotes an optical axial thickness of the positive lens made of plastic disposed nearest to the object in the second lens unit, $D_t$ denotes an overall optical axial length at the wide angle end, of the three-unit zoom lens system, and the overall length is a length which is obtained by adding a back focus expressed in terms of an air conversion length, to an optical axial thickness from a surface of incidence of a lens nearest to the object up to a surface of emergence of a lens nearest to the image, of the three-unit zoom lens system.

Conditional expression (1) is an expression which specifies a zooming ratio, and it is preferable to secure the zooming ratio by making an arrangement such that a value is not lower than a lower limit value in conditional expression (1).

Conditional expression (2) is an expression which specifies a thickness of the positive lens made of plastic.

When an attempt is made to have a high zooming ratio which satisfies conditional expression (1), a spherical aberration and an astigmatism in the second lens unit are susceptible to occur. Therefore, by securing the thickness of the positive lens made of plastic by making an arrangement such that a value is not lower than a lower limit value in conditional expression (2), the correction of the spherical aberration and the astigmatism becomes easy.

Moreover, it is preferable to make an arrangement such that the three-unit zoom lens system satisfies any of the following arrangements.

It is preferable that the third lens unit moves to a position of increasing magnification at the telephoto end with respect to the wide angle end.

Accordingly, it is possible to distribute the zooming load with the second lens unit, and it becomes easy to suppress a fluctuation in aberration which is caused along with the high zooming ratio.

It is preferable that the three-unit zoom lens system according to the present invention satisfies the following conditional expressions (3), (4).

$$1.0 < D_w/(IH_w \times f_t/f_w) < 3.5 \quad (3)$$

$$1.0 < D_t/(IH_w \times f_t/f_w) < 2.85 \quad (4)$$

where, $IH_w$ denotes an image height at the wide angle end, and $D_w$ denotes the overall optical axial length at the telephoto end of the zoom lens system.

Conditional expressions (3) and (4) are expressions which specify a preferable overall length at the wide angle end and the telephoto end respectively, of the three-unit zoom lens system. By making an arrangement such that a value is not lower than a lower limit value in conditional expressions (3) and (4), it becomes easy to suppress the refracting power of each lens unit and an occurrence of a longitudinal aberration and an oblique aberration, which is convenient for securing the optical performance.

By making an arrangement such that a value is not higher than an upper limit value in conditional expression (3) and (4), it is advantageous for making a size of each lens small.

Moreover, it is preferable that the three-unit zoom lens system according to the present invention satisfies the following conditional expression (5).

$$1.3 < f_{G2}/f_w < 3.5 \quad (5)$$

where, $f_{G2}$ is a focal length of the second lens unit.

Conditional expression (5) is an expression which specifies a focal length of the second lens unit.

By making an arrangement such that a value is not lower than a lower limit value in conditional expression (5), a refracting power of the second lens unit is suppressed, and it becomes easy to correct an aberration favorably.

By making an arrangement such that a value is not higher than an upper limit value in conditional expression (5), it becomes easy to secure the refracting power of the second lens unit, and to suppress the overall length for maintaining the high zooming ratio.

Moreover, in the three-unit zoom lens system according to the present invention, it is preferable that the positive lens made of plastic in the second lens unit is a biconvex positive lens which satisfies the following conditional expression.

$$-0.8 < (r_{L21f} + r_{L21r})/(r_{L21f} - r_{L21r}) < 0 \qquad (6)$$

where, $r_{L21f}$ denotes a paraxial radius of curvature of a surface on the object side of the positive lens made of plastic nearest to the object in the second lens unit, and $r_{L21f}$ denotes a paraxial radius of curvature of a surface on the image side of the positive lens made of plastic nearest to the object in the second lens unit.

Conditional expression (6) is an expression which specifies a preferable shape factor of the positive lens made of plastic.

By making an arrangement such that a value is not lower than a lower limit value in conditional expression (6) it becomes easy to suppress a curvature of an object side surface of the positive lens made of plastic, and to suppress an occurrence of an aberration such as a coma aberration.

By making an arrangement such that a value is not higher than an upper limit value in conditional expression (6), it becomes easy to secure a refracting power of the positive lens made of plastic, and it is advantageous for having the high zooming ratio.

In the three-unit zoom lens system according to the present invention, it is preferable that the total number of lenses in the three-unit zoom lens system is five.

Accordingly, it is easy to secure the optical performance while having a merit of a reduction in cost.

In the three-unit zoom lens system according to the present invention, it is preferable that the total number of lenses in the third lens unit is one.

Accordingly, it is advantageous from a view point of a small size and a low cost.

Moreover, in the three-unit zoom lens system according to the present invention, it is preferable that the first lens unit includes in order from the object side thereof, two lenses namely, a negative lens and a positive lens, and the second lens unit includes in order from the object side thereof two lenses namely, the positive lens made of plastic and a negative lens, the third lens unit includes a lens having a positive refracting power or a negative refracting power, and an Abbe's number of the positive lens in the first lens unit and the negative lens in the second lens unit, is smaller than an Abbe's number of the negative lens in the first lens unit, the positive lens made of plastic in the second lens unit, and the lens in the third lens unit.

By bringing a principal point of the first lens unit toward the object side, it is easy to reduce a diameter of the first lens unit and the overall length of the zoom lens system. Moreover, it becomes easy to suppress a chromatic aberration in the first lens unit by the fewer number of lenses.

It is possible to bring a principal point of the second lens unit toward the object side, and it becomes easy to increase the zooming ratio with respect to an amount of change of a distance between the first lens unit and the second lens unit, which is advantageous for having a small size and a high zooming ratio. Moreover, it becomes easy to suppress the chromatic aberration of the second lens unit by the fewer number of lenses.

By letting the third lens unit to be a one-lens structure, it is advantageous for slimming when a lens barrel is collapsed.

Moreover, it is preferable to have the abovementioned relation between the Abbe's number of the lenses in order to impart a function of correcting the chromatic aberration to the positive lens in the first lens unit and the negative lens in the second lens unit.

In the three-unit zoom lens system of the present invention, it is preferable that each lens in the third lens unit is a single lens.

By satisfying conditional expression (2) mentioned above, it is advantageous for an aberration correction even without using a cemented lens, and it is possible to reduce an effect of decentering. Therefore, it is advantageous for securing the optical performance and reducing the cost by securing the number of refracting surfaces, without using a cemented lens.

In the three-unit zoom lens system according to the present invention, it is preferable that a proportion of the plastic lenses is 40% and more.

By forming 40% or more of the lenses by a plastic lens, it is possible to provide a low cost zoom lens system.

Moreover, in the three-unit zoom lens system according to the present invention, it is preferable that both lens surfaces namely, a lens surface nearest to the object and the lens surface nearest to the image in the second lens unit are aspheric surfaces.

Accordingly, a correction of the spherical aberration in all states from the wide angle end to the telephoto end becomes easy.

Figure 18:
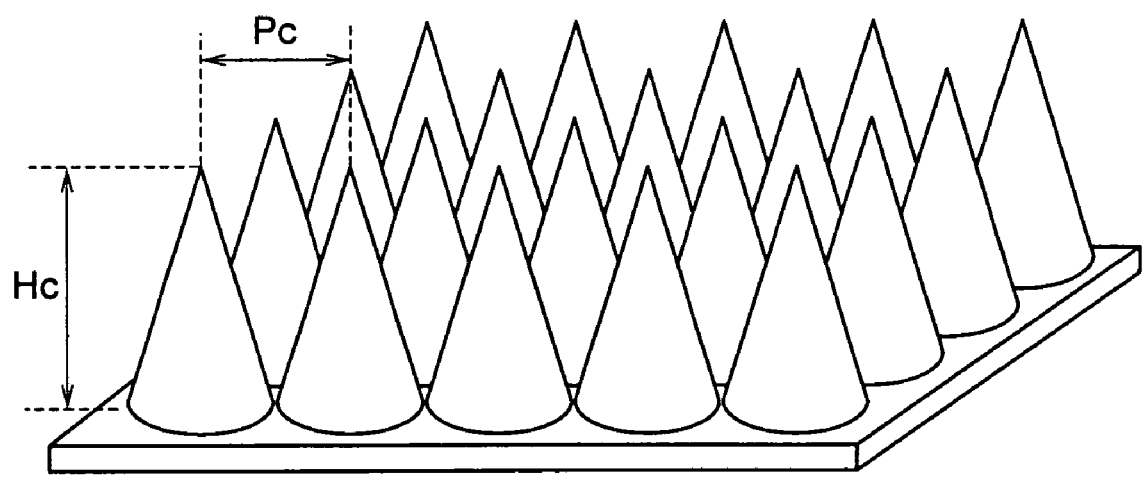
FIG. 18 is a diagram describing a anti-reflection structure.

Incidentally, as it has been known from a report No. 20 of 2006 by 'Technology Research Institute of Osaka Prefecture', a technology of a anti-reflection structure having a plurality of protrusions arranged two-dimensionally at a cycle shorter than a wavelength of visible light rays (400 nm~700 nm) which is a usable wavelength, has been known (refer to FIG. 18).

In a case of a zoom lens system, since a passing of light rays changes according to a zooming state, it is difficult to suppress in a zoom range, an occurrence of a ghost caused due to light reflected at a lens surface. Therefore, it is preferable that the ghost is reduced by imparting a lens surface having such structure to one of the lenses in the zoom lens system.

It is preferable to provide such anti-reflection structure in one of the lens units in the three-unit zoom lens system.

In this case, it is preferable to provide the anti-reflection structure to at least one of a surface of incidence and a surface of emergence of the plastic lens, as the processing becomes easy.

Moreover, it is preferable to impart such a fine structure, since it becomes easy to reduce an occurrence of a moire in an area near the aperture stop.

In the three-unit zoom lens system according to the present invention, it is preferable to impart the anti-reflection structure having the plurality of protrusion arranged three-dimensionally at a cycle shorter than the wavelength of the visible light, to at least one of the surface on the object side and the surface on the image side of the positive lens made of plastic nearest to the object in the second lens unit.

Moreover, it is easy to have a anti-reflection effect when the light rays are incident in a direction perpendicular to the lens surface having the plurality of protrusions, and in a case of the three-unit zoom lens system according to the present invention, it is preferable to impart the anti-reflection structure having the plurality of protrusions arranged two-dimensionally at a cycle shorter than the wavelength of the visible light, to a lens in the third lens unit.

In the three-unit zoom lens system of the present invention, it is preferable that a preferable concrete pitch and a height of the protrusion satisfy the following conditional expressions.

$$20\ nm < Pc < 400\ nm \tag{7}$$

$$1.0 < Hc/Pc < 20.0 \tag{8}$$

where,

Pc denotes a pitch of the protrusions, and

Hc denotes the height of the protrusion.

Conditional expression (7) is an expression which specifies the preferable pitch between the protrusions.

By making an arrangement such that a value is not lower than a lower limit value in conditional expression (7), it becomes easy to suppress a cost from a point of view of manufacturing.

By making an arrangement such that a value is not higher than a higher limit value in conditional expression (8), it becomes easy to have a function of reducing the reflection.

Conditional expression (8) is an expression which specifies a preferable relationship between the pitch of the protrusions and the height of the protrusion.

By making an arrangement such that a value is not lower than a lower limit value in conditional expression (8), it becomes easy to have the function of reducing the reflection.

By making an arrangement such that a value is not higher than a higher limit value in conditional expression (8), it becomes easy to suppress an effect of imparting an MTF.

Moreover, in the three-unit zoom lens system, an arrangement may be made such that, the third lens unit has a positive refracting power, and is positioned on the image side at the telephoto end with respect to the wide angle end, and the focusing from the long distance object to the short distance object is carried out by moving the third lens unit toward the object side.

When the characteristics of an image pickup element are favorable in an area near a direction perpendicular to an image pickup surface, it is preferable to let the third lens unit to have a positive refracting power. Moreover, by letting the third lens unit of which the size can be made small, to be a focusing lens unit, it becomes easy to suppress a load on a drive system at the time of focusing.

Moreover, in the three-unit zoom lens system according to the present invention, an arrangement may be made such that, the third lens unit has a negative refracting power, and is positioned on the object side at the telephoto end with respect to the wide angle end, and the focusing from the long distance object to the short distance object is carried out by moving the third lens unit toward the image side.

When the characteristics of the image pickup element are favorable in an area near a direction inclined progressively with respect to the perpendicular around the image pickup surface, it is preferable to let the third lens unit to have a negative refracting power, which is advantageous for making small a diameter of the zoom lens system. Moreover, by letting the third lens unit of which the size can be made small, to be a focusing lens unit, it becomes easy to suppress the load on the drive system at the time of focusing.

Moreover, in the three-unit zoom lens system of the present invention, it is preferable that the positive lens made of plastic, in the second lens unit satisfies the following conditional expressions.

$$1.40 < nd_{L21} < 1.55 \tag{9}$$

$$45 < vd_{L21} < 75 \tag{10}$$

where, $nd_{L21}$ denotes a refractive index with respect to a d-line, of the positive lens made of plastic nearest to the object, in the second lens unit, and $vd_{L21}$ denotes an Abbe's number of the positive lens made of plastic nearest to the object, in the second lens unit.

Even when a lens having a low refractive index which satisfies conditional expressions (9) and (10) is used as a lens nearest to the object in the second lens unit, by satisfying conditional expression (2) mentioned above, it is possible to have the favorable optical performance while having a high zooming ratio of about 4.

By making an arrangement such that a value is not lower than a lower limit value in conditional expression (9), it is advantageous for securing a refracting power of the positive lens. By making an arrangement such that a value is not higher than a higher limit value in conditional expression (9), it is possible to form the lens by a low-cost plastic. By making an arrangement such that a value is not lower than a lower limit value in conditional expression (10), it becomes easy to suppress the chromatic aberration at the second lens unit. By making an arrangement such that a value is not higher than an upper limit value in conditional expression (10), it becomes easy to make a lens material to be low cost.

Moreover, it is possible to use any of the abovementioned three-unit zoom lens systems as an image forming lens of an image pickup apparatus.

In other words, it is preferable that the image pickup apparatus is let to be an image pickup apparatus which includes a three-unit zoom lens system, and an image pickup element which is disposed at an image side of the three-unit zoom lens system, and which converts an optical image formed by the three-unit zoom lens system, to an electric signal, and the three-unit zoom lens system is any of the abovementioned three-unit zoom lens systems.

Accordingly, it is advantageous for making small a size of an apparatus.

Furthermore, it is preferable that the image pickup apparatus includes an image conversion section which converts the electric signal including a distortion due to the three-unit zoom lens system, to an image signal in which, the distortion is corrected by an image processing. By allowing the distortion of the three-unit zoom lens system, it is advantageous for reducing the number of lenses and making small the size of the three-unit zoom lens system.

Each of the abovementioned conditional expressions is let to be an arrangement in a state of being focused at the longest possible distance, when the three-unit zoom lens system has a focusing function.

It is preferable that each aspect of the present invention described above satisfies a plurality of conditional expressions simultaneously. Moreover, regarding each conditional expression, it is preferable to make the following arrangement.

It is preferable to let a lower limit value in conditional expression (1) to be 3.7, and a lower limit value of 3.8 is more preferable.

It is preferable to provide an upper limit value (in conditional expression (1)), and make an arrangement such that a value is not higher than 8.0, and preferably not higher than 5.5.

Accordingly, it is advantageous for making the size small and maintaining the optical performance.

For reducing a thickness of the second lens unit, it is preferable to provide an upper limit value in conditional expression (2), and to make an arrangement such that a value is not higher than 0.2, and preferably not higher than 0.15.

It is preferable to let a lower limit value in conditional expression (3) to be 1.3, and a lower limit value of 1.8 is more preferable.

It is preferable to let an upper limit value in conditional expression (3) to be 3.3, further 3.1 and an upper limit value of 3.0 is more preferable.

It is preferable to let a lower limit value in conditional expression (4) to be 1.8, and a lower limit value of 2.0 is more preferable.

It is preferable to let an upper limit value in conditional expression (4) to be 2.84, further 2.8, and an upper limit value of 2.7 is more preferable.

It is preferable to let a lower limit value in conditional expression (5) to be 1.5, and a lower limit value of 1.8 is more preferable.

It is preferable to let an upper limit value in conditional expression (5) to be 2.3, and an upper limit value of 2.1 is more preferable.

It is preferable to let a lower limit value in conditional expression (6) to be −0.6, and a lower limit value of −0.5 is more preferable.

It is preferable to let an upper limit value in conditional expression (6) to be −0.2, and an upper limit value of −0.25 is more preferable.

It is preferable that each aspect of the invention described above satisfies arbitrarily a plurality of conditional expressions simultaneously. Moreover, regarding each conditional expression, only an upper limit value and a lower limit value in a range of numerical values of the more restricted conditional expression may be restricted. Moreover, various structures described above may be combined arbitrarily.

Exemplary embodiments of the three-unit zoom lens system and the image pickup apparatus including the three-unit zoom lens system will be described below in detail by referring to the accompanying diagrams. However, the present invention is not restricted to the embodiments described below.

Embodiments

Each of the embodiments described below is a three-unit zoom lens system of lenses having a negative, positive, and positive refracting power type (embodiments from a first embodiment to a sixth embodiment) or a three-unit zoom lens system of lenses having a negative, positive, and negative refracting power type (embodiments from a seventh embodiment to a twelfth embodiment), having a favorable optical performance in which, a high zooming ratio of about 4 is achieved, and a half image angle at a wide angle end of 35° and more is secured.

Moreover, each of the three-unit zoom lens systems has a compact arrangement when the lens barrel is collapsed, with the fewer number of lenses.

In the embodiments from the first embodiment to the third embodiment, and the embodiments from the seventh embodiment to the ninth embodiment, an effective image pickup area in a full-zoom state is rectangular and constant.

Corresponding values in conditional expressions in each embodiment are values when focused to the infinite object point.

The overall length is a length which is obtained by adding a back focus expressed in terms of an air conversion length, to an optical axial distance from a surface of incidence to a surface of emergence of a lens. The back focus is expressed in terms of an air conversion length.

As it will be described later in each embodiment, at the time of zooming from the wide angle end to the telephoto end, the first lens unit, after moving toward the image side, moves toward the object side. The second lens unit moves only toward the object side. The third lens unit, after moving toward the object side, moves toward the image side, and is moved to a position of increasing the magnification at the telephoto end with respect to the wide angle end.

The focusing is carried out by moving the third lens unit, and an operation of focusing from a long distance object point to a short distance object point is carried out by moving the third lens unit toward the object side when the third lens unit has a positive refracting power, and by moving the third unit toward the image side when the third lens unit has a negative refracting power.

As it will be described later, a parallel flat plate is a CCD cover glass and a low pass filter coated by IR (infra red rays) cutting coating.

The aperture stop is disposed immediately before the second lens unit, and a flare stop is disposed immediately after the second lens unit. The aperture stop and the flare stop move integrally with the second lens unit.

Moreover, the positive lens in the second lens unit, and the lens forming the third lens unit in each embodiment are plastic lenses.

A surface on the object side and a surface of emergence of the plastic lens has a fine structure in which, a plurality of protrusions in the form of a circular column are disposed two-dimensionally (refer to FIG. 18).

In these minute structures, the pitch Pc of the protrusions is 200 nm which is uniform, and the height Hc of each protrusion is 1000 nm.

In the diagrams, the protrusions in each row are arranged to coincide. However, an arrangement pattern may be such that the protrusions are arranged to be shifted alternately in each row.

A corresponding value in conditional expression (7) is 200 nm, and a corresponding value in conditional expression (8) is 5.

Moreover, the pitch and the height of the protrusions, a shape of the protrusion, a direction in which an apex of the protrusion is directed, an arrangement pattern, and a lens surface on which the minute structure is provided may be adjusted appropriately according to performance which is sought (such as an MTF, the anti-reflection effect, and the manufacturing cost).

The embodiments from the first embodiment to the third embodiment and the embodiments from the seventh embodiment to the ninth embodiment of the three-unit zoom lens system according to the present invention will be described below. Lens cross-sectional view at the wide angle end (FIG. 1A, FIG. 2A, FIG. 3A, FIG. 4A, FIG. 5A, and FIG. 6A), at the intermediate focal length state (FIG. 1B, FIG. 2B, FIG. 3B, FIG. 4B, FIG. 5B, and FIG. 6B), and at the telephoto end (FIG. 1C, FIG. 2C, FIG. 3C, FIG. 4C, FIG. 5C, and FIG. 6C) at the time of infinite object point focusing of the embodiments from the first embodiment to the third embodiment, and the embodiments from the seventh embodiment to the ninth embodiment are shown in FIG. 1A to FIG. 6C. In FIG.

Figure 6A:
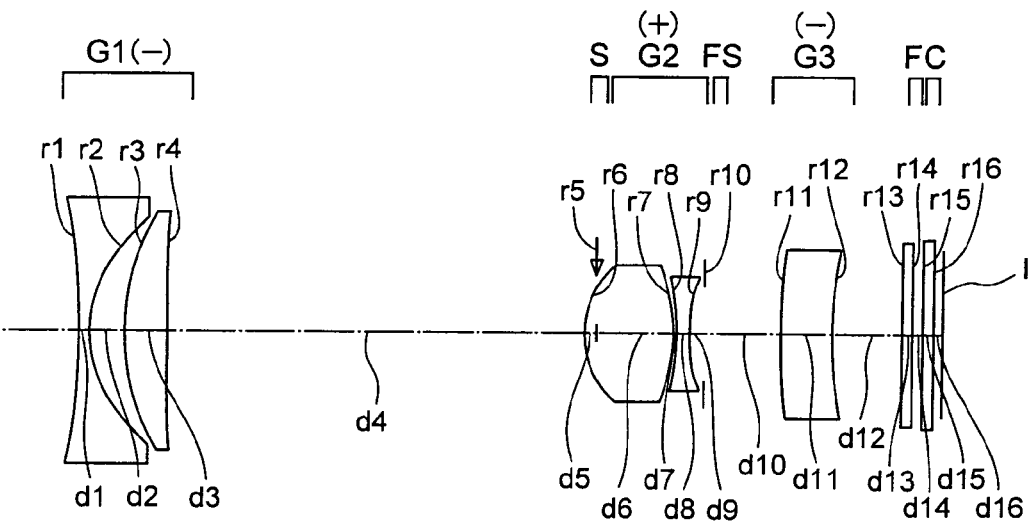
FIG. 6A, FIG. 6B, and FIG. 6C are diagrams similar to FIG. 1A, FIG. 1B, and FIG. 1C respectively, of a ninth embodiment of the zoom lens system according to the present invention.
Figure 6B:
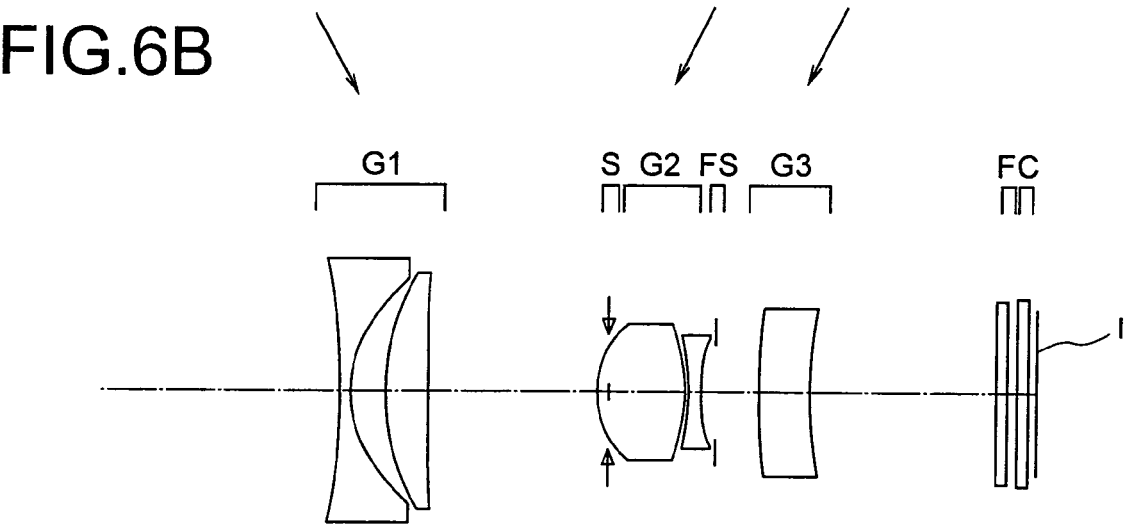
Figure 6C:
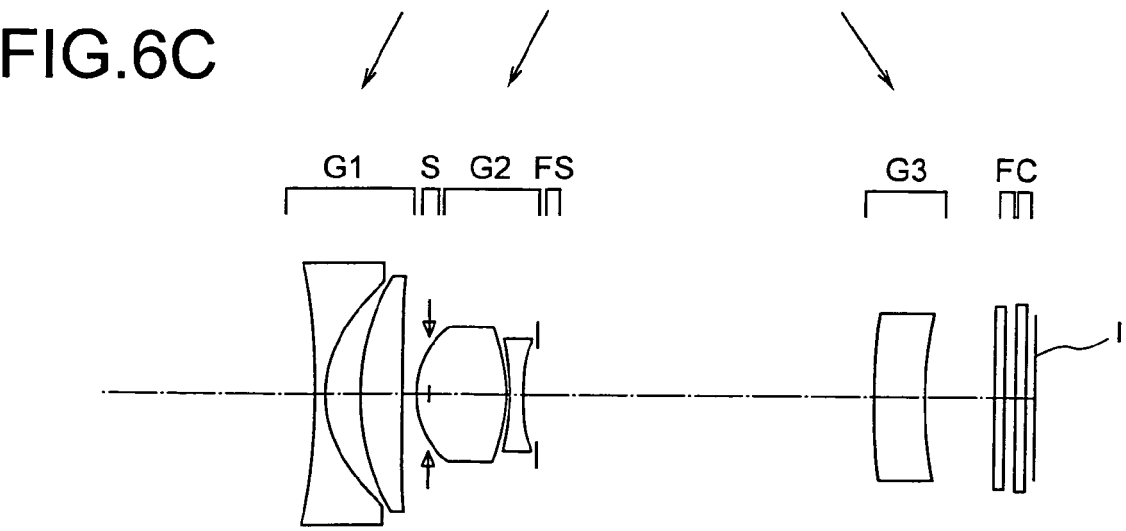
Figure 7A:
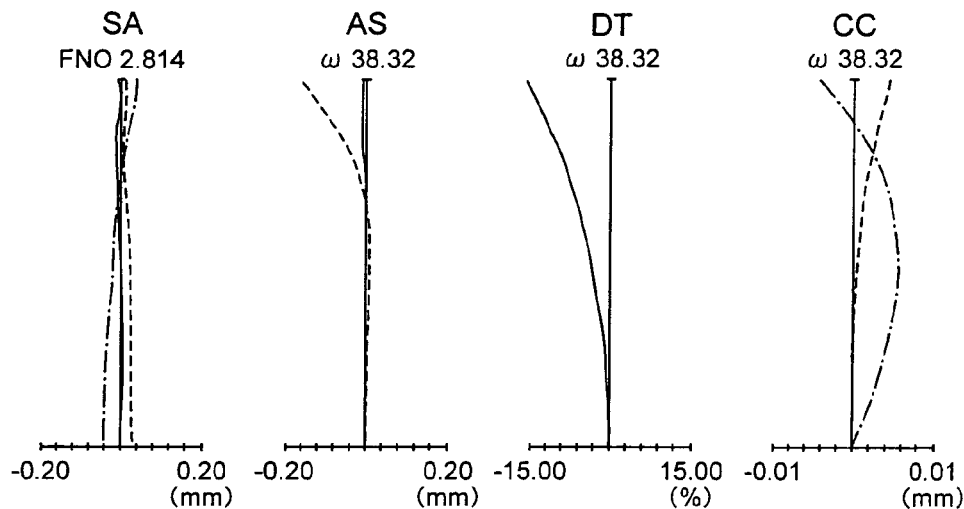
FIG. 7A, FIG. 7B, and FIG. 7C are aberration diagrams at the time of infinite object point focusing, of the first embodiment.
Figure 7B:
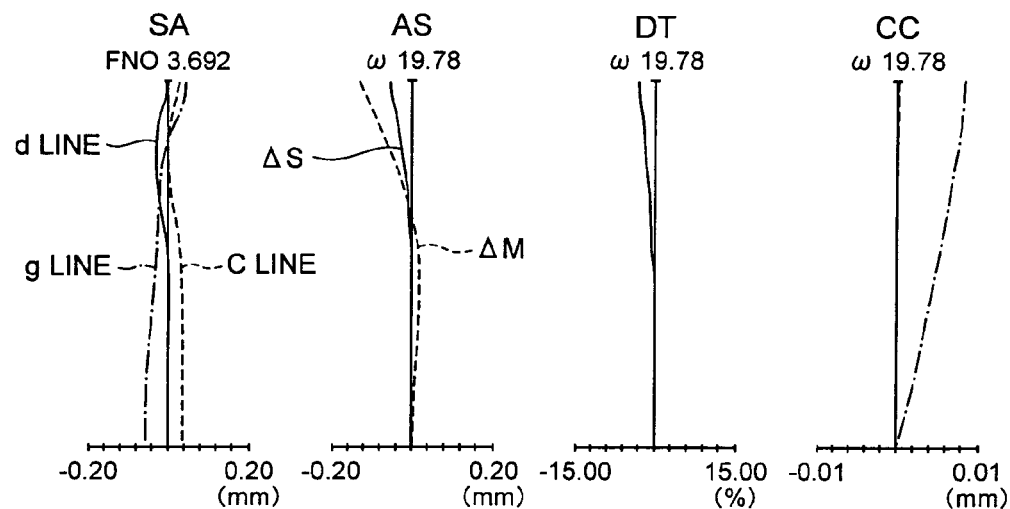
Figure 7C:
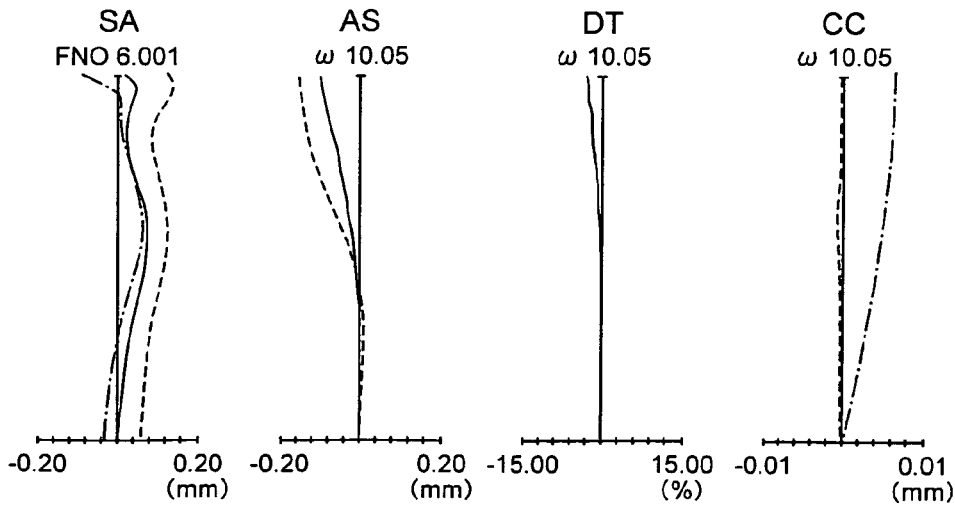
Figure 8A:
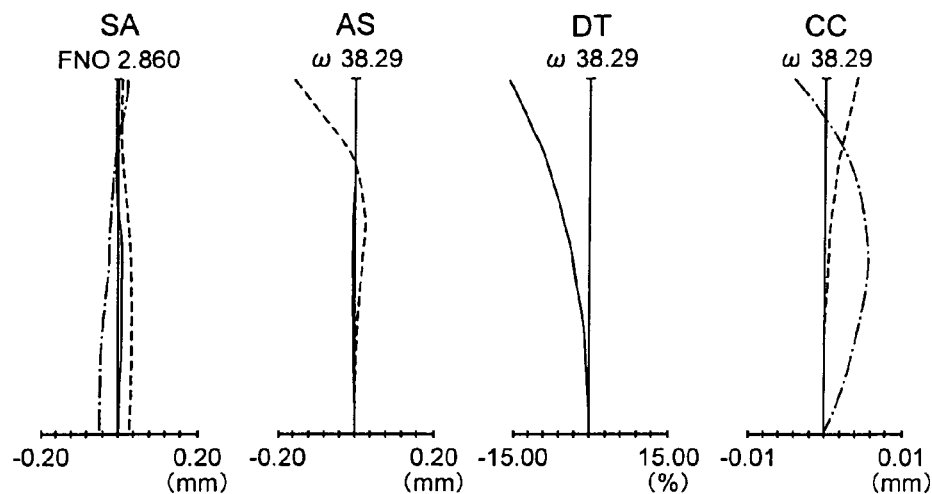
FIG. 8A, FIG. 8B, and FIG. 8C are aberration diagrams at the time of infinite object point focusing, of the second embodiment.
Figure 8B:
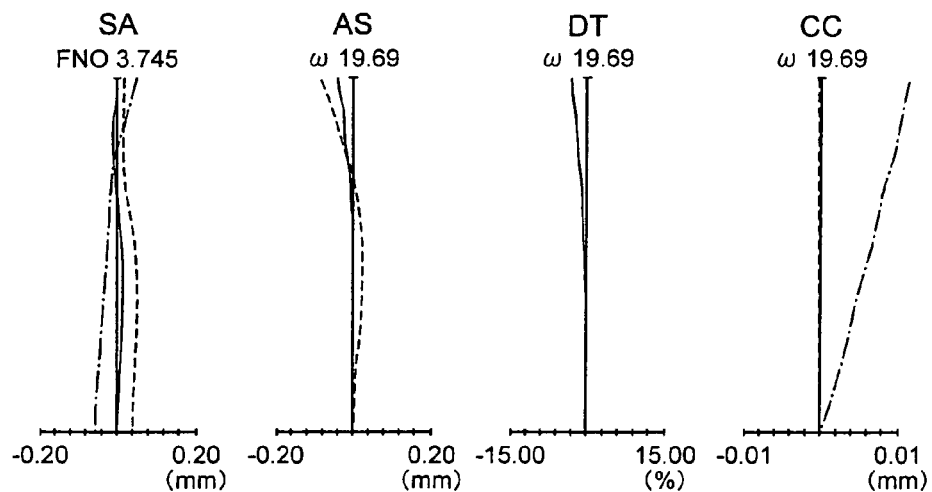
Figure 8C:
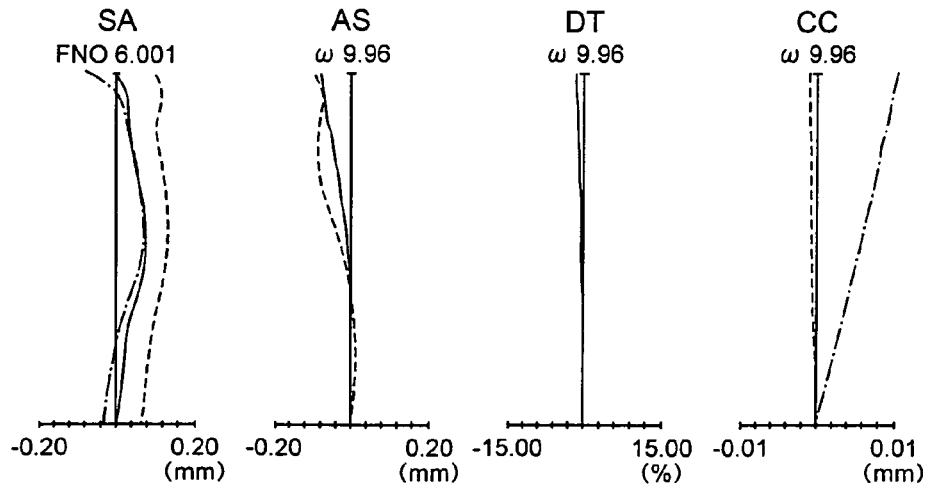
Figure 9A:
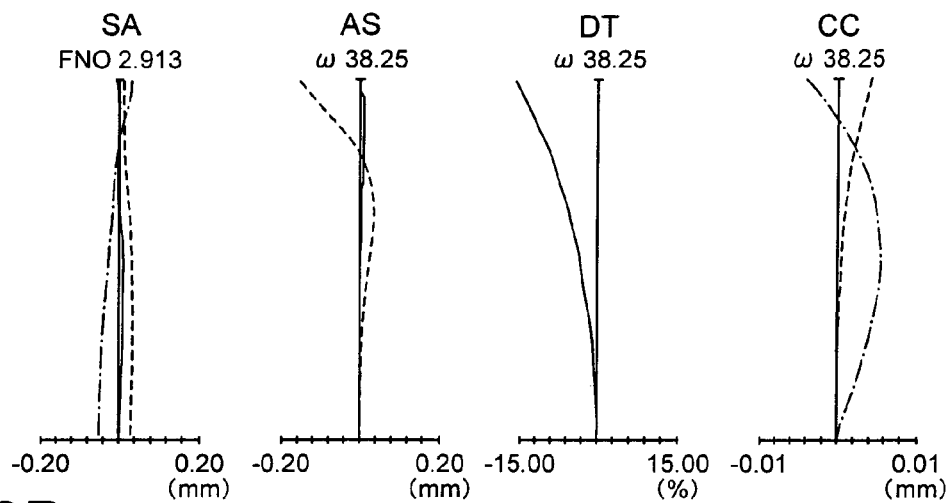
FIG. 9A, FIG. 9B, and FIG. 9C are aberration diagrams at the time of infinite object point focusing, of the third embodiment.
Figure 9B:
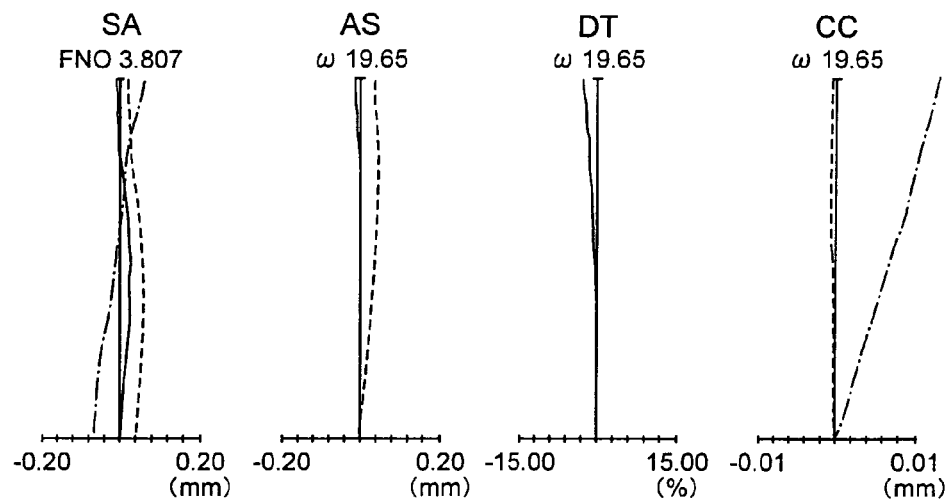
Figure 9C:
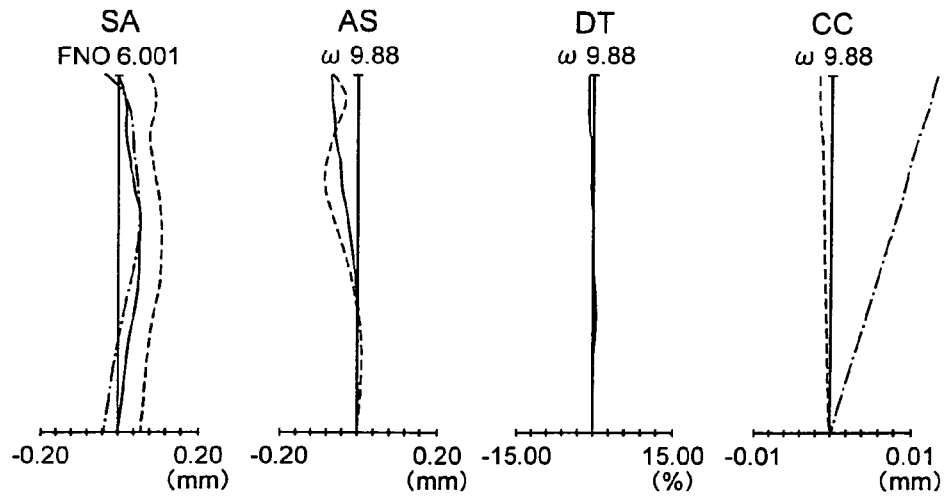
Figure 10A:
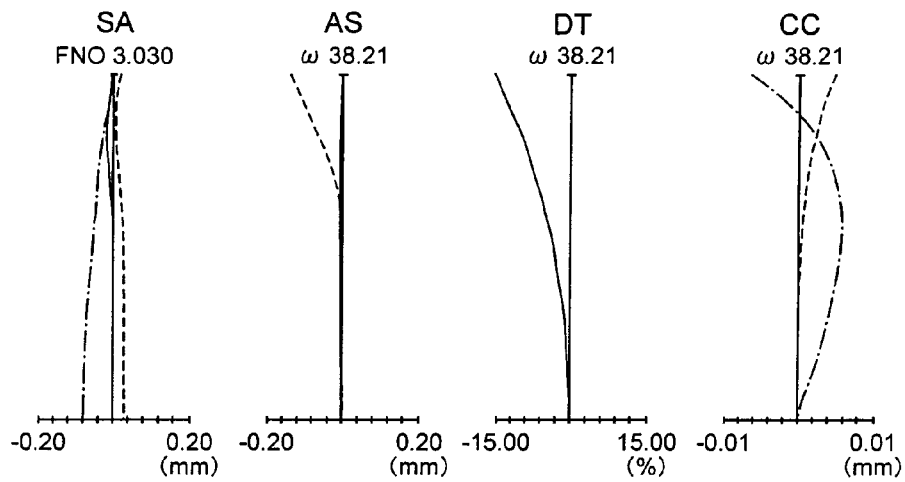
FIG. 10A, FIG. 10B, and FIG. 10C are aberration diagrams at the time of infinite object point focusing, of the seventh embodiment.
Figure 10B:
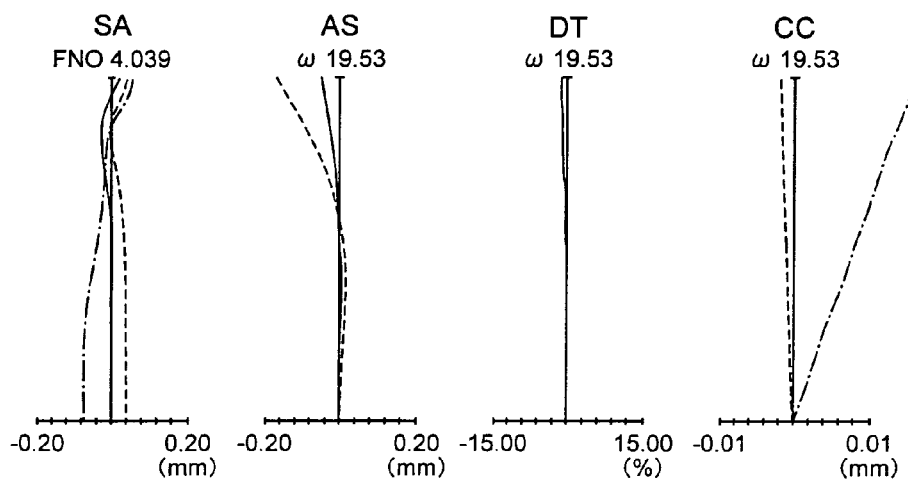
Figure 10C:
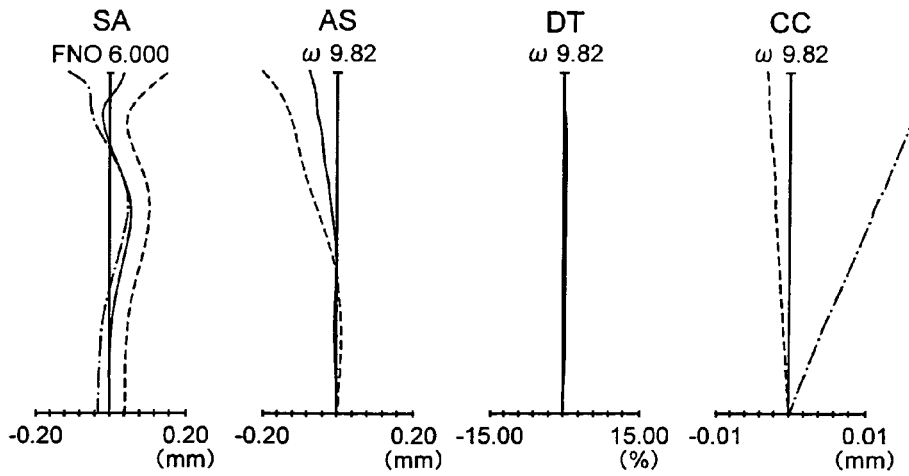
Figure 11A:
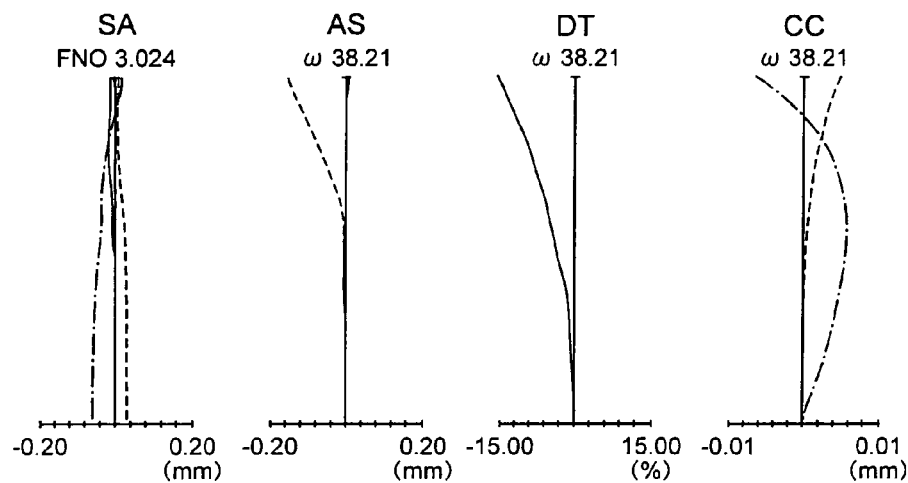
FIG. 11A, FIG. 11B, and FIG. 11C are aberration diagrams at the time of infinite object point focusing, of the eighth embodiment.
Figure 11B:
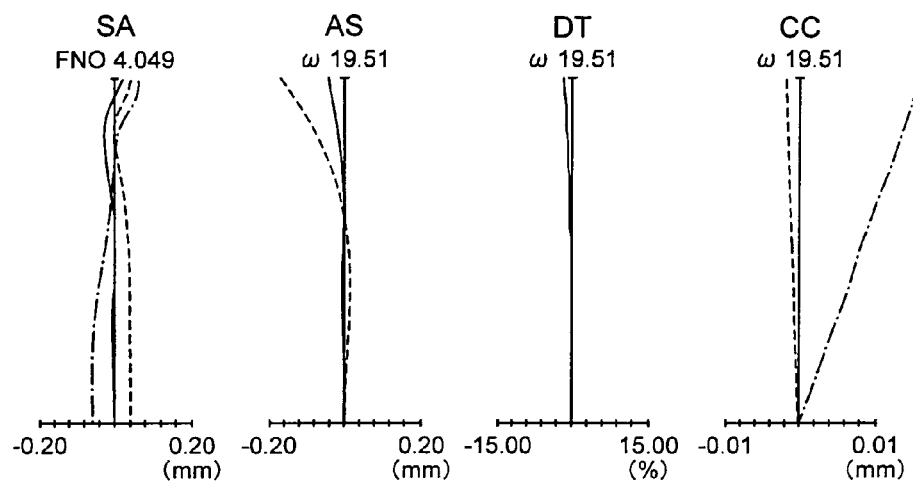
Figure 11C:
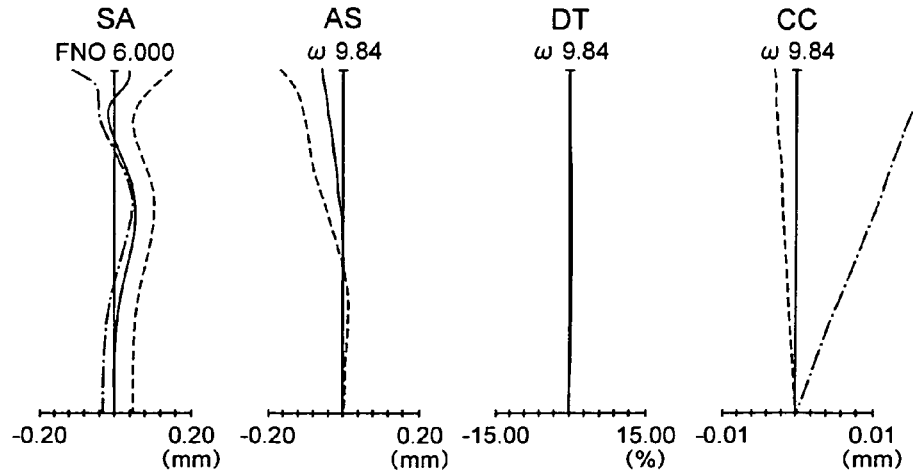
Figure 12A:
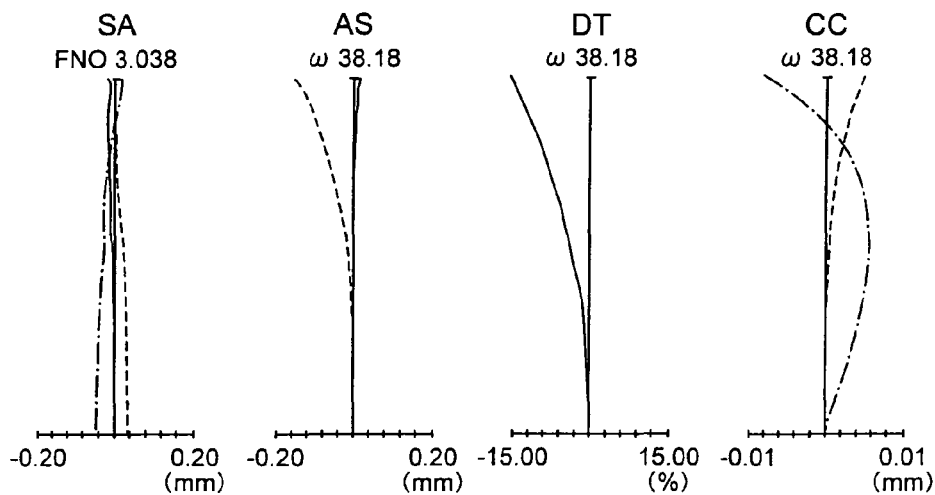
FIG. 12A, FIG. 12B, and FIG. 12C are aberration diagrams at the time of infinite object point focusing, of the ninth embodiment.
Figure 12B:
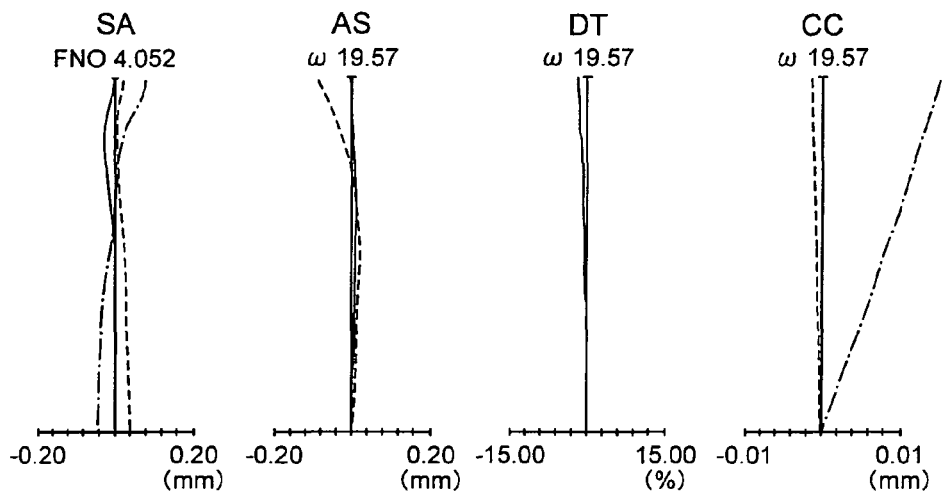
Figure 12C:
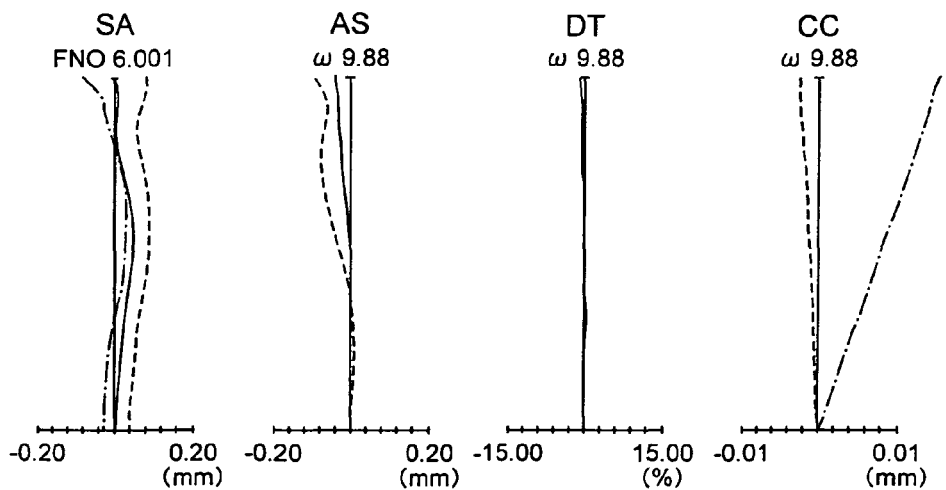

1A to FIG. 6C, G1 denotes a first lens unit, S denotes an aperture stop, G2 denotes a second lens unit, FS denotes a flare stop, G3 denotes a third lens unit, F denotes a parallel flat plate which forms a low pass filter in which, a wavelength restricting coating which restricts infrared light is applied, C denotes a parallel flat plate of carbon glass of an electronic image pickup element, and I denotes an image plane. A multilayered film for restricting a wavelength region may be applied to a surface of the carbon glass C. Moreover, the carbon glass C may be let to have an effect of a low pass filter.

Moreover, numerical data is a data in a state of being focused (when focused) at an object at an infinite distance. A unit of length for each value is mm, and a unit of angle is degree (°). Focusing in each embodiment is carried out by moving a lens unit nearest to the image. Further, zoom data is values at the wide angle end (WE), the intermediate focal length state (ST), and the telephoto end (TE).

Figure 1B:
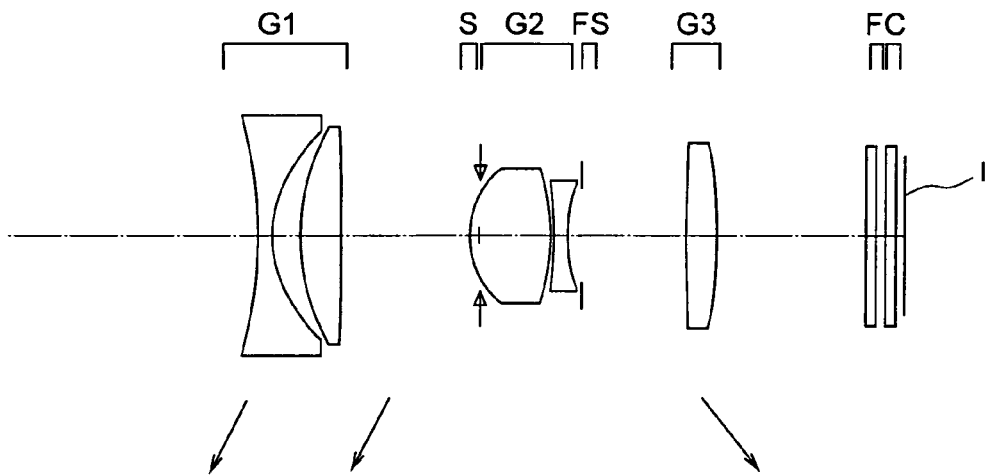
Figure 1C:
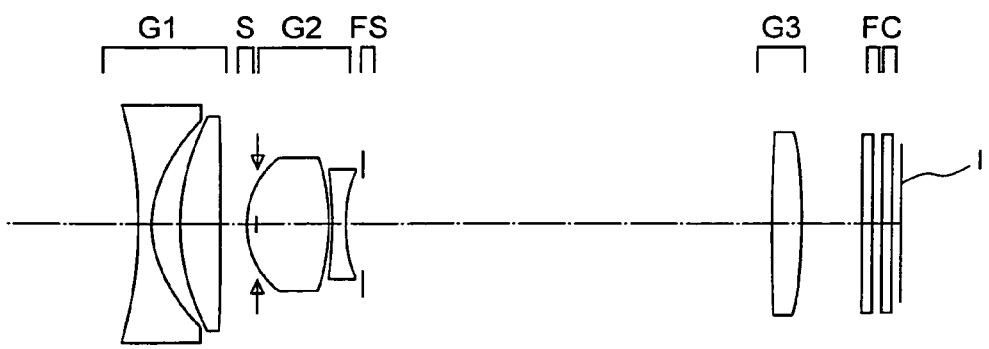

A zoom lens system in the first embodiment, as shown in FIG. 1A, FIG. 1B, and FIG. 1C, includes in order from an object side thereof, a first lens unit G1 having a negative refracting power, an aperture stop S, a second lens unit G2 having a positive refracting power, a flare stop FS, and a third lens unit G3 having a positive refracting power.

At the time of zooming from the wide angle end to the telephoto end, the first lens unit G1, after moving toward the image side, moves toward the object side. The second lens unit G2 moves only toward the object side. The third lens unit G3, after moving toward the object side, moves toward the image side, and moves to a position of increasing the magnification at the telephoto end with respect to the wide angle end.

In order from the object side, the first lens unit G1 includes a biconcave negative lens and a positive meniscus lens having a convex surface directed toward the object side. The second lens unit G2 includes a biconvex positive lens and a biconcave negative lens. The third lens unit G3 includes a biconvex positive lens.

An aspheric surface is used for four surfaces namely, a surface on the image side of the biconcave negative lens in the first lens unit G1, a surface on the object side of the biconvex positive lens and a surface on the image side of the biconcave negative lens in the second lens unit G2, and a surface on the image side of the biconvex positive lens in the third lens unit G3.

Figure 2A:
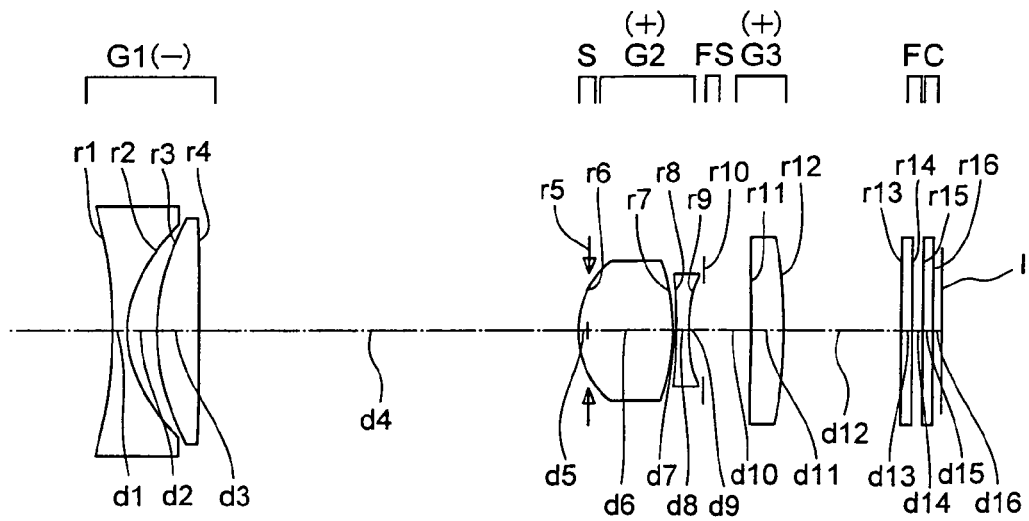
FIG. 2A, FIG. 2B, and FIG. 2C are diagrams similar to FIG. 1A, FIG. 1B, and FIG. 1C respectively, of a second embodiment of the zoom lens system according to the present invention.
Figure 2B:
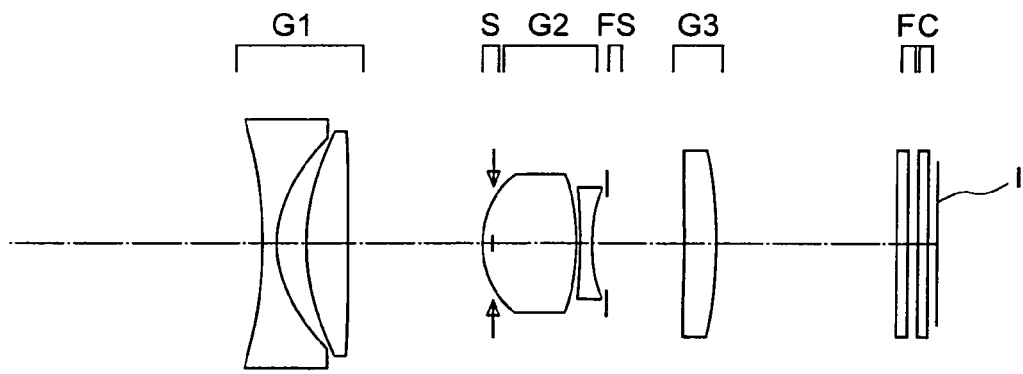
Figure 2C:
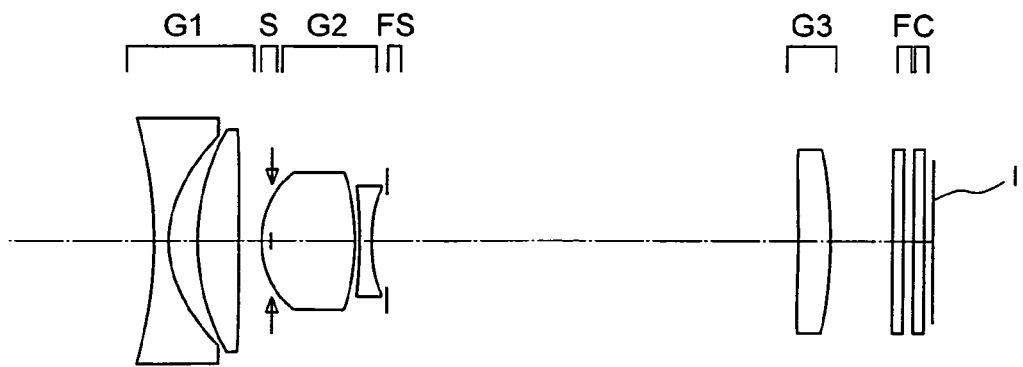

A zoom lens system in the second embodiment, as shown in FIG. 2A, FIG. 2B, and FIG. 2C, includes in order from the object side thereof, a first lens unit G1 having a negative refracting power, an aperture stop S, a second lens unit G2 having a positive refracting power, a flare stop FS, and a third lens unit G3 having a positive refracting power.

At the time of zooming from the wide angle end to the telephoto end, the first lens unit G1, after moving toward the image side, moves toward the object side. The second lens unit G2 moves only toward the object side. The third lens unit G3, after moving toward the object side, moves toward the image side, and moves to a position of increasing the magnification at the telephoto end with respect to the wide angle end.

In order from the object side, the first lens unit G1 includes a biconcave negative lens and a positive meniscus lens having a convex surface directed toward the object side. The second lens unit G2 includes a biconvex positive lens and a biconcave negative lens. The third lens unit G3 includes a positive meniscus lens having a convex surface directed toward the image side.

An aspheric surface is used for four surfaces namely, a surface on the image side of the biconcave negative lens in the first lens unit G1, a surface on the object side of the biconvex positive lens and a surface on the image side of the biconcave negative lens in the second lens unit G2, and a surface on the image side of the positive meniscus lens in the third lens unit G3.

Figure 3A:
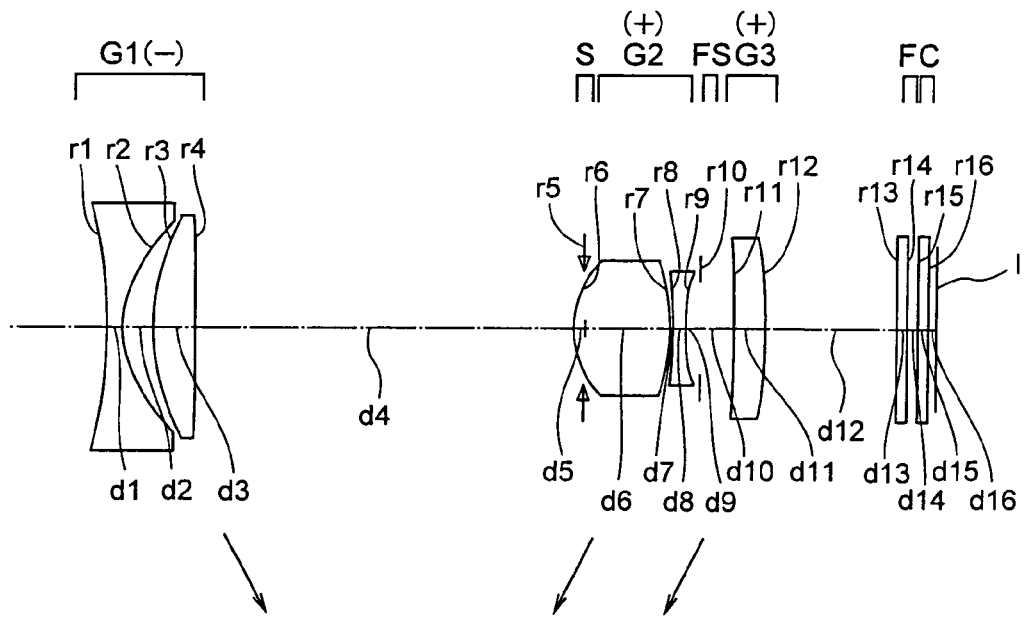
FIG. 3A, FIG. 3B, and FIG. 3C are diagrams similar to FIG. 1A, FIG. 1B, and FIG. 1C respectively, of a third embodiment of the zoom lens system according to the present invention.
Figure 3B:
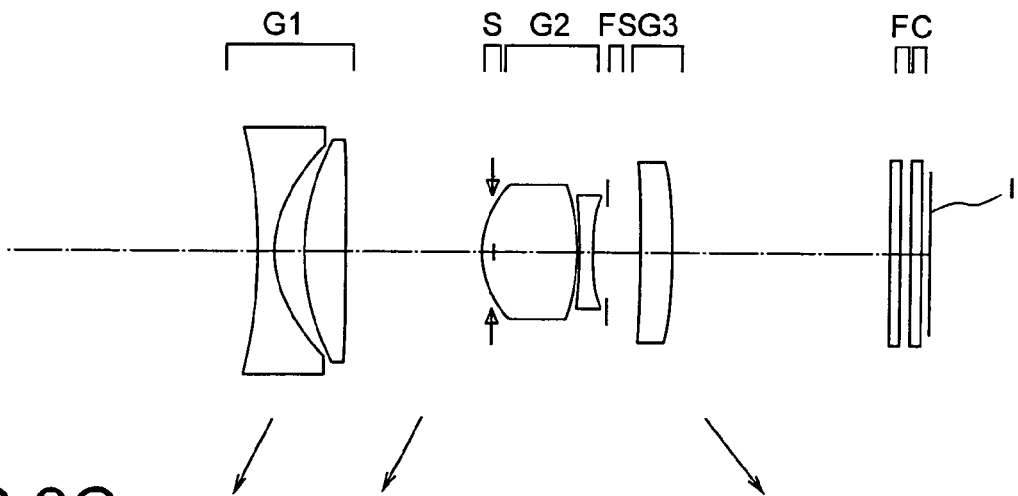
Figure 3C:
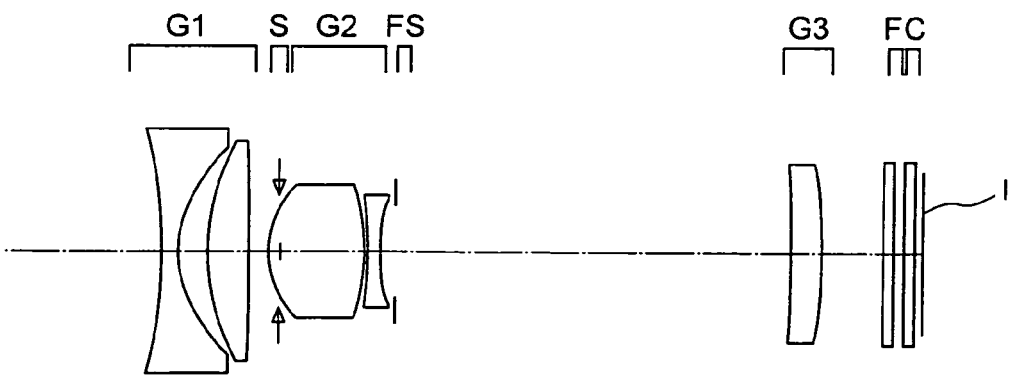

A zoom lens system in the third embodiment, as shown in FIG. 3A, FIG. 3B, and FIG. 3C, includes in order from the object side thereof, a first lens unit G1 having a negative refracting power, an aperture stop S, a second lens unit G2 having a positive refracting power, a flare stop FS, and a third lens unit G3 having a positive refracting power.

At the time of zooming from the wide angle end to the telephoto end, the first lens unit G1, after moving toward the image side, moves toward the object side. The second lens unit G2 moves only toward the object side. The third lens unit G3, after moving toward the object side, moves toward the image side, and moves to a position of increasing the magnification at the telephoto end with respect to the wide angle end.

In order from the object side, the first lens unit G1 includes a biconcave negative lens and a positive meniscus lens having a convex surface directed toward the object side. The second lens unit G2 includes a biconvex positive lens and a biconcave negative lens. The third lens unit G3 includes a positive meniscus lens having a convex surface directed toward the image side.

An aspheric surface is used for four surfaces namely, a surface on the image side of the biconcave negative lens in the first lens unit G1, a surface on the object side of the biconvex positive lens and a surface on the image side of the biconcave negative lens in the second lens unit G2, and a surface on the image side of the positive meniscus lens in the third lens unit G3.

Figure 4A:
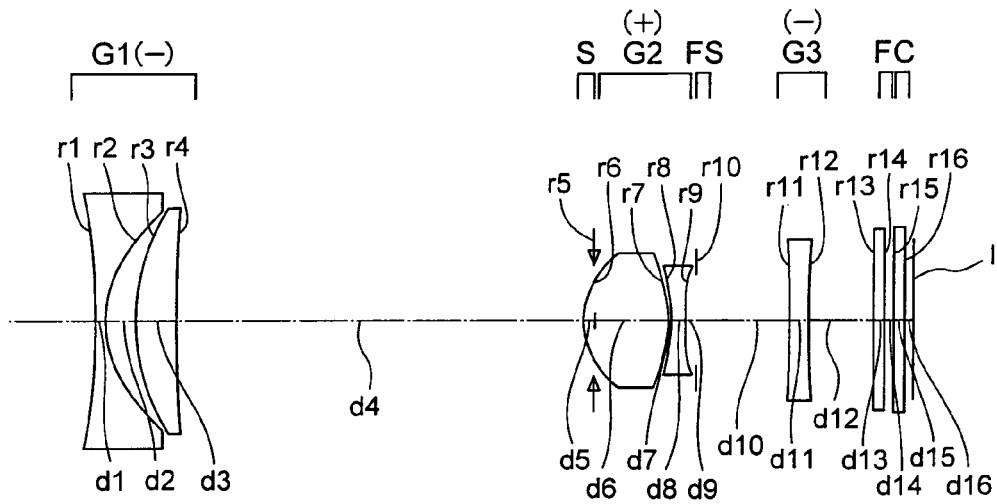
FIG. 4A, FIG. 4B, and FIG. 4C are diagrams similar to FIG. 1A, FIG. 1B, and FIG. 1C respectively, of a seventh embodiment of the zoom lens system according to the present invention.
Figure 4B:
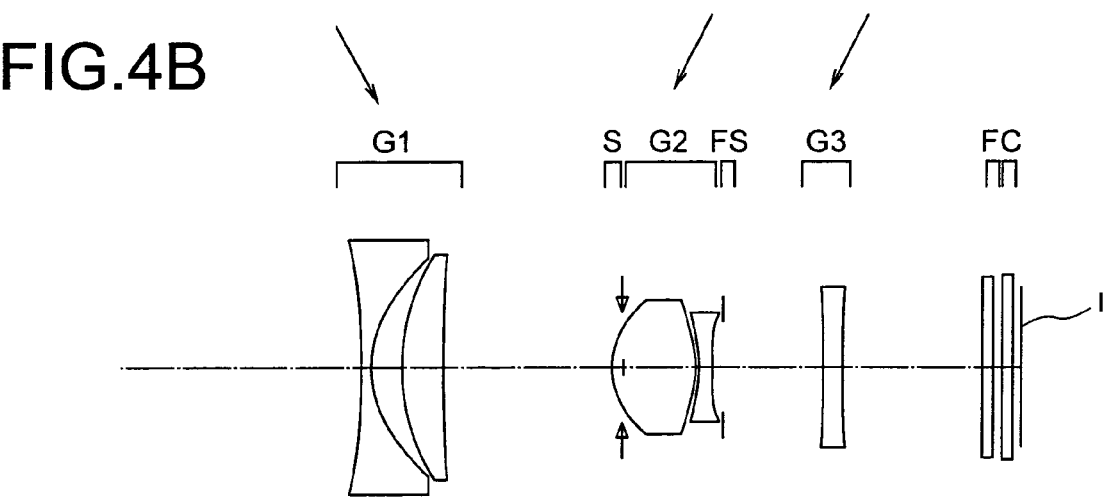
Figure 4C:
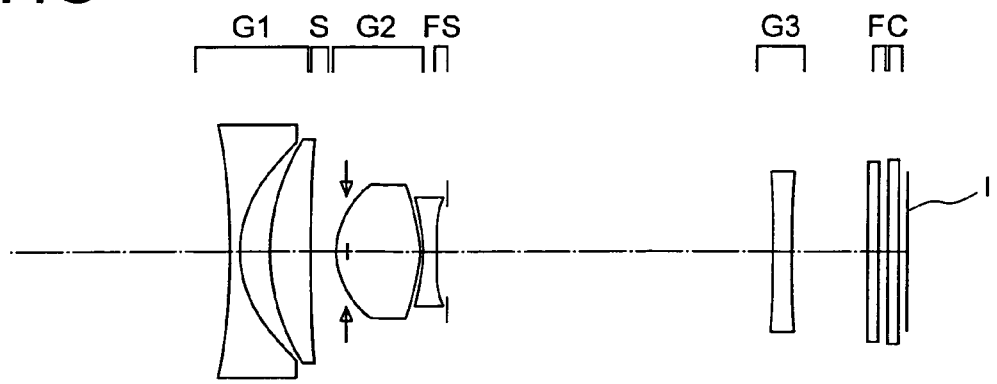

A zoom lens system in the seventh embodiment, as shown in FIG. 4A, FIG. 4B, and FIG. 4C, includes in order from the object side thereof, a first lens unit G1 having a negative refracting power, an aperture stop S, a second lens unit G2 having a positive refracting power, a flare stop FS, and a third lens unit G3 having a negative refracting power.

At the time of zooming from the wide angle end to the telephoto end, the first lens unit G1, after moving toward the image side, moves toward the object side. The second lens unit G2 moves only toward the object side. The third lens unit G3, after moving toward the object side, moves toward the image side, and moves to a position of increasing magnification at the telephoto end with respect to the wide angle end.

In order from the object side, the first lens unit G1 includes a biconcave negative lens and a positive meniscus lens having a convex surface directed toward the object side. The second lens unit G2 includes a biconvex positive lens and a biconcave negative lens. The third lens unit G3 includes a biconcave negative lens.

An aspheric surface is used for five surfaces namely, a surface on the image side of the biconcave negative lens in the first lens unit G1, a surface on the object side of the biconvex positive lens and a surface on the image side of the biconcave negative lens in the second lens unit G2, and both surfaces of the biconcave negative lens in the third lens unit G3.

Figure 5A:
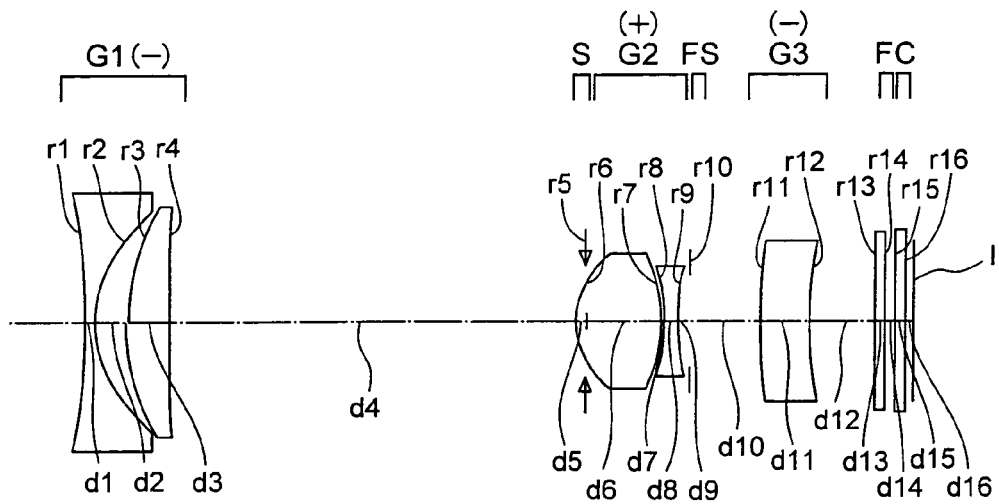
FIG. 5A, FIG. 5B, and FIG. 5C are diagrams similar to FIG. 1A, FIG. 1B, and FIG. 1C respectively, of an eighth embodiment of the zoom lens system according to the present invention.
Figure 5B:
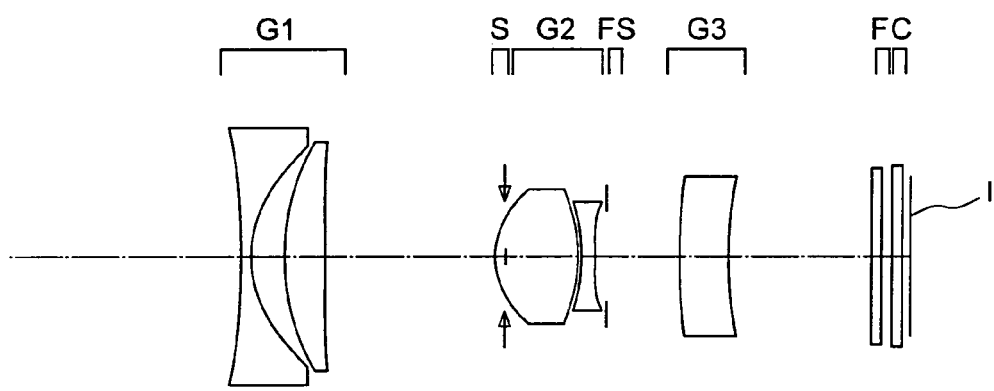
Figure 5C:
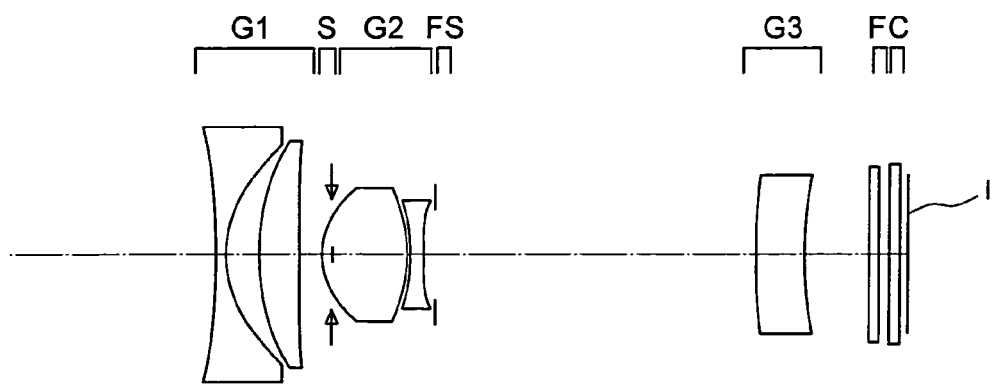

A zoom lens system in the eighth embodiment, as shown in FIG. 5A, FIG. 5B, and FIG. 5C, includes in order from the object side thereof, a first lens unit G1 having a negative refracting power, an aperture stop S, a second lens unit G2 having a positive refracting power, a flare stop FS, and a third lens unit G3 having a negative refracting power.

At the time of zooming from the wide angle end to the telephoto end, the first lens unit G1, after moving toward the image side, moves toward the object side. The second lens unit G2 moves only toward the object side. The third lens unit G3, after moving toward the object side, moves toward the image side, and moves to a position of increasing the magnification at the telephoto end with respect to the wide angle end.

In order from the object side, the first lens unit G1 includes a biconcave negative lens and a positive meniscus lens having a convex surface directed toward the object side. The second lens unit G2 includes a biconvex positive lens and a biconcave negative lens. The third lens unit G3 includes a negative meniscus lens having a convex surface directed toward the object side.

An aspheric surface is used for five surfaces namely, a surface on the image side of the biconcave negative lens in the first lens unit G1, a surface on the object side of the biconvex positive lens and a surface on the image side of the biconcave negative lens in the second lens unit G2, and both surfaces of the negative meniscus lens in the third lens unit G3.

A zoom lens system in the ninth embodiment, as shown in FIG. 6A, FIG. 6B, and FIG. 6C, includes in order from the object side thereof, a first lens unit G1 having a negative refracting power, an aperture stop S, a second lens unit G2 having a positive refracting power, a flare stop FS, and a third lens unit G3 having a negative refracting power.

At the time of zooming from the wide angle end to the telephoto end, the first lens unit G1, after moving toward the image side, moves toward the object side. The second lens unit G2 moves only toward the object side. The third lens unit G3, after moving toward the object side, moves toward the image side, and moves to a position of increasing the magnification at the telephoto end with respect to the wide angle end.

In order from the object side, the first lens unit G1 includes a biconcave lens and a positive meniscus lens having a convex surface directed toward the object side. The second lens unit G2 includes a biconvex positive lens and a biconcave negative lens. The third lens unit G3 includes a negative meniscus lens having a convex surface directed toward the object side.

An aspheric surface is used for five surfaces namely, a surface on the image side of the biconcave negative lens in the first lens unit G1, a surface on the object side of the biconvex positive lens and a surface on the image side of the biconcave negative lens in the second lens unit G2, and both surfaces of the negative meniscus lens in the third lens unit G3.

In embodiments from a fourth embodiment to a sixth embodiment, the zoom lens systems in the embodiments from the first embodiment to the third embodiment respectively are used, and in embodiments from a tenth embodiment to a twelfth embodiment, the zoom lens systems in the embodiments from the seventh embodiment to the ninth embodiment are used. These embodiments are examples in which, an image pickup apparatus which corrects the distortion electrically is used, and a shape of the effective image pickup area changes at the time of zooming. Therefore, these embodiments differ from embodiments in which the image height and the image angle in a zoom state correspond.

The image pickup apparatus is an apparatus which includes a zoom lens system having a half image angle ω of 35° and more at the wide angle end.

In the embodiments from the fourth embodiment to the sixth embodiment, and from the tenth embodiment to the twelfth embodiment, an image is recorded and displayed upon correcting electrically a barrel distortion which occurs at the wide angle side.

In the zoom lens system of these embodiments, a barrel distortion occurs at the wide angle end, on a rectangular photoelectric conversion surface. Whereas, an occurrence of distortion at the telephoto end near the intermediate focal length state is suppressed.

For correcting the distortion electrically, the effective image pickup area is let to be barrel shaped at the wide angle end, and rectangular shaped at the intermediate focal length state and the telephoto end.

Moreover, the effective image pickup area which is set in advance is subjected to image conversion by an image processing, and is converted to rectangular image information in which the distortion is reduced.

An arrangement is made such that, the maximum image height $IH_w$ at the wide angle end becomes smaller than the maximum image height $IH_s$ at the intermediate focal length state, and the maximum image height $IH_t$ at the telephoto end.

In the embodiments from the fourth embodiment to the sixth embodiment, and the embodiments from the tenth embodiment to the twelfth embodiment, an arrangement is made such that, at the wide angle end, a length in a direction of a short side of the photoelectric conversion surface is same as a length in a direction of a short side of the effective image pickup area, and the effective image pickup area is set to be such that, about −3% of distortion remains after the image processing. As a matter of course, an arrangement may be made such that, an image in which, a barrel shaped area smaller than this is converted to a rectangular shape as the effective image pickup area, is let to be an image which is recorded and reproduced.

Numerical data of each embodiment described above is shown below. Apart from symbols described above, f denotes a focal length of the entire zoom lens system, $F_{NO}$ denotes an F number, ω denotes a half image angle, WE denotes a wide angle end, ST denotes an intermediate state, TE denotes a telephoto end, each of r1, r2, ... denotes radius of curvature of each lens surface, each of d1, d2, ... denotes a distance between two lenses, each of nd1, nd2, ... denotes a refractive index of each lens for a d-line, and each of vd1, vd2, ... denotes an Abbe's number for each lens.

The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

When x is let to be an optical axis with a direction of traveling of light as a positive (direction), and y is let to be in a direction orthogonal to the optical axis, a shape of the aspheric surface is described by the following expression.

$$x=(y^2/r)/[1+\{1-(K+1)(y/r)^2\}^{1/2}]+A_4y^4+A_6y^6+A_8y^8+A_{10}y^{10}+A_{12}y^{12}$$

where, r denotes a paraxial radius of curvature, K denotes a conical coefficient, A4, A6, A8, A10, and A12 denote aspherical surface coefficients of a fourth order, a sixth order, an eight order, a tenth order, and a twelfth order respectively. Moreover, in the aspherical surface coefficients, 'e−n' (where, n is an integral number) indicates '$10^{-n}$'.

Example 1

| | unit mm | | | |
|---|---|---|---|---|
| | Surface data | | | |
| Surface No | r | d | nd | vd |
| 1 | −22.398 | 0.70 | 1.81474 | 37.03 |
| 2* | 5.429 | 1.41 | | |
| 3 | 11.723 | 2.00 | 2.00069 | 25.46 |

-continued unit mm

| | | | | |
|---|---|---|---|---|
| 4 | −276.104 | Variable | | |
| 5 (S) | ∞ | −0.51 | | |
| 6* | 4.270 | 4.07 | 1.53113 | 55.30 |
| 7 | −10.090 | 0.10 | | |
| 8 | −19.195 | 0.70 | 1.84666 | 23.78 |
| 9* | 12.248 | 0.46 | | |
| 10 | ∞ | Variable | | |
| 11 | 94.735 | 1.51 | 1.53113 | 55.30 |
| 12* | −36.398 | Variable | | |
| 13 | ∞ | 0.50 | 1.51633 | 64.14 |
| 14 | ∞ | 0.50 | | |
| 15 | ∞ | 0.50 | 1.51633 | 64.14 |
| Image plane | (Light receiving surface) | | | |

Aspherical coefficients

2nd surface $k = -1.276$, $A4 = 7.65182e-05$, $A6 = -1.12787e-06$,
$A8 = -7.61698e-08$, $A10 = 1.24621e-09$ 6th surface $k = -0.338$, $A4 = 1.68661e-04$, $A6 = 2.29377e-05$, $A8 = -1.24250e-06$,
$A10 = 2.37188e-08$ 9th surface $k = 0.000$, $A4 = 2.59010e-03$, $A6 = 2.07469e-04$, $A8 = -9.83520e-06$,
$A10 = 3.46391e-06$ 12th surface $k = 0.000$, $A4 = 6.98110e-05$, $A6 = -3.68048e-05$, $A8 = 2.01948e-06$,
$A10 = -4.09637e-08$ Unit focal length

| f1 = −13.46 | f2 = 11.23 | f3 = 49.71 |
|---|---|---|

Zoom data

| | WE | ST | TE |
|---|---|---|---|
| IH | 3.84 | 3.84 | 3.84 |
| focal length | 5.77 | 11.00 | 22.20 |
| Fno. | 2.81 | 3.69 | 6.00 |
| 2ω (°) | 76.63 | 39.57 | 20.11 |
| BF | 6.31 | 9.00 | 4.61 |
| Total length | 38.68 | 31.74 | 37.56 |
| d4 | 18.36 | 6.82 | 1.78 |
| d10 | 3.56 | 5.48 | 20.72 |
| d12 | 4.70 | 7.39 | 3.00 |

Example 2 unit mm

Surface data

| Surface No | r | d | nd | vd |
|---|---|---|---|---|
| 1 | −23.292 | 0.70 | 1.81474 | 37.03 |
| 2* | 5.423 | 1.41 | | |
| 3 | 11.589 | 2.00 | 2.00069 | 25.46 |
| 4 | −747.195 | Variable | | |
| 5 (s) | ∞ | −0.51 | | |
| 6* | 4.617 | 4.52 | 1.53113 | 55.30 |
| 7 | −12.557 | 0.10 | | |
| 8 | −54.557 | 0.70 | 1.92286 | 20.88 |
| 9* | 13.235 | 0.46 | | |
| 10 | ∞ | Variable | | |

-continued unit mm

| | | | | |
|---|---|---|---|---|
| 11 | −428.766 | 1.51 | 1.53113 | 55.30 |
| 12* | −34.828 | Variable | | |
| 13 | ∞ | 0.50 | 1.51633 | 64.14 |
| 14 | ∞ | 0.50 | | |
| 15 | ∞ | 0.50 | 1.51633 | 64.14 |
| 16 | ∞ | 0.45 | | |
| Image plane | (Light receiving surface) | | | |

Aspherical coefficients

2nd surface $k = -1.106$, $A4 = -4.25366e-05$, $A6 = 2.00619e-06$,
$A8 = -1.97237e-07$, $A10 = 3.12855e-09$ 6th surface $k = -0.368$, $A4 = 8.05469e-05$, $A6 = 2.02728e-05$, $A8 = -1.55737e-06$,
$A10 = 6.94253e-08$ 9th surface $k = 0.000$, $A4 = 1.85122e-03$, $A6 = 1.19119e-04$, $A8 = -3.11607e-06$,
$A10 = 1.61693e-06$ 12th surface $k = 0.000$, $A4 = 1.43521e-04$, $A6 = -5.04172e-05$, $A8 = 3.57535e-06$,
$A10 = -9.00871e-08$ Unit focal length

| f1 = −13.32 | f2 = 11.07 | f3 = 71.28 |
|---|---|---|

Zoom data

| | WE | ST | TE |
|---|---|---|---|
| IH | 3.84 | 3.84 | 3.84 |
| focal length | 5.77 | 11.00 | 22.20 |
| Fno. | 2.86 | 3.75 | 6.00 |
| 2ω (°) | 76.58 | 39.38 | 19.93 |
| BF | 7.22 | 10.24 | 4.61 |
| Total length | 38.92 | 31.85 | 36.99 |
| d4 | 18.32 | 6.81 | 1.54 |
| d10 | 2.49 | 3.90 | 19.95 |
| d12 | 5.61 | 8.63 | 3.00 |

Example 3 unit mm

Surface data

| Surface No | r | d | nd | vd |
|---|---|---|---|---|
| 1 | −25.824 | 0.70 | 1.83441 | 37.28 |
| 2* | 5.491 | 1.41 | | |
| 3 | 11.526 | 2.00 | 2.00069 | 25.46 |
| 4 | 1050.736 | Variable | | |
| 5 (s) | ∞ | −0.51 | | |
| 6* | 4.676 | 4.65 | 1.53113 | 55.30 |
| 7 | −11.538 | 0.10 | | |
| 8 | −29.249 | 0.70 | 1.92286 | 20.88 |
| 9* | 17.470 | 0.46 | | |
| 10 | ∞ | Variable | | |
| 11 | −69.689 | 1.51 | 1.53113 | 55.30 |
| 12* | −34.749 | Variable | | |
| 13 | ∞ | 0.50 | 1.51633 | 64.14 |
| 14 | ∞ | 0.50 | | |

-continued unit mm

| | | | | |
|---|---|---|---|---|
| 15 | ∞ | 0.50 | 1.51633 | 64.14 |
| 16 | ∞ | 0.45 | | |
| Image plane | (Light receiving surface) | | | |

Aspherical coefficients

2nd surface k = −0.948, A4 = −1.22782e−04, A6 = 2.59208e−06,
A8 = −2.23252e−07, A10 = 3.49305e−09

6th surface k = −0.370, A4 = 9.73136e−05, A6 = 1.94831e−05, A8 = −1.31372e−06,
A10 = 6.11195e−08

9th surface k = 0.000, A4 = 1.76178e−03, A6 = 1.06045e−04, A8 = −1.67422e−06,
A10 = 1.30027e−06

12th surface k = 0.000, A4 = 2.35677e−04, A6 = −6.93308e−05, A8 = 5.91438e−06,
A10 = −1.72314e−07

Unit focal length

| f1 = −13.04 | f2 = 10.86 | f3 = 128.57 |
|---|---|---|

Zoom data

| | WE | ST | TE |
|---|---|---|---|
| IH | 3.84 | 3.84 | 3.84 |
| focal length | 5.77 | 11.00 | 22.20 |
| Fno. | 2.91 | 3.81 | 6.00 |
| 2ω (°) | 76.50 | 39.30 | 19.77 |
| BF | 7.93 | 12.23 | 4.61 |
| Total length | 39.27 | 32.07 | 36.49 |
| d4 | 18.52 | 7.05 | 1.50 |
| d10 | 1.80 | 1.77 | 19.36 |
| d12 | 6.32 | 10.62 | 3.00 |

A zoom lens system of the fourth embodiment has a structure same as a structure of the zoom lens system of the first embodiment.

A zoom lens system of the fifth embodiment has a structure same as a structure of the zoom lens system of the second embodiment.

A zoom lens system of the sixth embodiment has a structure same as a structure of the zoom lens system of the third embodiment.

Example 4

Data of the image height and full-image angle in the fourth embodiment is shown below.

Zoom data

| | WE | ST | TE |
|---|---|---|---|
| IH | 3.57 | 3.84 | 3.84 |
| focal length | 5.77 | 11.00 | 22.20 |
| Fno. | 2.81 | 3.69 | 6.00 |
| 2ω (°) | 70.85 | 39.57 | 20.11 |

Example 5

Data of the image height and full-image angle in the fifth embodiment is shown below.

Zoom data

| | WE | ST | TE |
|---|---|---|---|
| IH | 3.57 | 3.84 | 3.84 |
| focal length | 5.77 | 11.00 | 22.20 |
| Fno. | 2.86 | 3.75 | 6.00 |
| 2ω (°) | 70.87 | 39.38 | 19.93 |

Example 6

Data of the image height and full-image angle in the sixth embodiment is shown below.

Zoom data

| | WE | ST | TE |
|---|---|---|---|
| IH | 3.57 | 3.84 | 3.84 |
| focal length | 5.77 | 11.00 | 22.20 |
| Fno. | 2.91 | 3.81 | 6.00 |
| 2ω (°) | 70.90 | 39.30 | 19.77 |

Example 7 unit mm

Surface data

| Surface No | r | d | nd | vd |
|---|---|---|---|---|
| 1 | −37.066 | 0.50 | 1.83400 | 37.16 |
| 2* | 5.581 | 1.42 | | |
| 3 | 10.740 | 2.00 | 2.00069 | 25.46 |
| 4 | 70.141 | Variable | | |
| 5(s) | ∞ | −0.51 | | |
| 6* | 4.028 | 4.17 | 1.53113 | 55.30 |
| 7 | −8.036 | 0.10 | | |
| 8 | −9.359 | 0.70 | 2.00069 | 25.46 |
| 9* | 54.813 | 0.46 | | |
| 10 | ∞ | Variable | | |
| 11* | −313.258 | 1.00 | 1.53113 | 55.30 |
| 12* | 61.705 | Variable | | |
| 13 | ∞ | 0.50 | 1.51633 | 64.14 |
| 14 | ∞ | 0.50 | | |
| 15 | ∞ | 0.50 | 1.51633 | 64.14 |
| 16 | ∞ | 0.45 | | |
| Image plane | (Light receiving surface) | | | |

Aspherical coefficients

2nd surface k = −0.874, A4 = −7.71601e−07, A6 = 1.06555e−06,
A8 = −1.12551e−07, A10 = 1.12285e−09

6th surface k = −0.337, A4 = 3.85561e−04, A6 = 3.03587e−05, A8 = 1.41610e−06,
A10 = −1.74735e−08

-continued unit mm

9th surface k = 0.000, A4 = 2.45896e−03, A6 = 2.15918e−04, A8 = −1.09896e−05, A10 = 4.84776e−06
11th surface k = 0.000, A4 = 2.11122e−04, A6 = −2.63091e−05, A8 = 8.17161e−07
12th surface k = 0.000, A4 = 5.70496e−04, A6 = −9.91714e−05, A8 = 7.13556e−06, A10 = −2.25030e−07

Unit focal length

| f1 = −13.36 | f2 = 10.32 | f3 = −96.97 |

Zoom data

|  | WE | ST | TE |
| --- | --- | --- | --- |
| IH | 3.84 | 3.84 | 3.84 |
| focal length | 5.77 | 11.00 | 22.20 |
| Fno. | 3.03 | 4.04 | 6.00 |
| 2ω(°) | 76.42 | 39.07 | 19.65 |
| BF | 4.81 | 8.51 | 5.31 |
| Total length | 39.58 | 32.14 | 33.07 |
| d4 | 20.32 | 8.85 | 1.76 |
| d10 | 4.61 | 4.93 | 16.16 |
| d12 | 3.20 | 6.90 | 3.70 |

-continued unit mm

9th surface k = 0.000, A4 = 2.43963e−03, A6 = 2.03393e−04, A8 = −8.51602e−06, A10 = 4.29640e−06
11th surface k = 0.000, A4 = 6.21311e−05, A6 = −1.47297e−05, A8 = 6.18500e−07
12th surface k = 0.000, A4 = 4.22943e−04, A6 = −9.20454e−05, A8 = 7.23541e−06, A10 = −2.27064e−07

Unit focal length

| f1 = −13.54 | f2 = 10.49 | f3 = −90.91 |

Zoom data

|  | WE | ST | TE |
| --- | --- | --- | --- |
| IH | 3.84 | 3.84 | 3.84 |
| focal length | 5.77 | 11.00 | 22.20 |
| Fno. | 3.02 | 4.05 | 6.00 |
| 2ω (°) | 76.43 | 39.03 | 19.67 |
| BF | 4.81 | 8.79 | 4.91 |
| Total length | 40.14 | 32.65 | 33.78 |
| d4 | 20.42 | 8.95 | 1.69 |
| d10 | 3.62 | 3.61 | 15.88 |
| d12 | 3.20 | 7.18 | 3.30 |

Example 8 unit mm

Surface data

| Surface No | r | d | nd | vd |
| --- | --- | --- | --- | --- |
| 1 | −33.324 | 0.50 | 1.83400 | 37.16 |
| 2* | 5.628 | 1.42 |  |  |
| 3 | 11.062 | 2.00 | 2.00069 | 25.46 |
| 4 | 100.197 | Variable |  |  |
| 5 (s) | ∞ | −0.51 |  |  |
| 6* | 4.058 | 4.19 | 1.53113 | 55.30 |
| 7 | −7.954 | 0.10 |  |  |
| 8 | −9.435 | 0.70 | 2.00069 | 25.46 |
| 9* | 48.207 | 0.46 |  |  |
| 10 | ∞ | Variable |  |  |
| 11* | 34.528 | 2.44 | 1.53113 | 55.30 |
| 12* | 19.639 | Variable |  |  |
| 13 | ∞ | 0.50 | 1.51633 | 64.14 |
| 14 | ∞ | 0.50 |  |  |
| 15 | ∞ | 0.50 | 1.51633 | 64.14 |
| 16 | ∞ | 0.45 |  |  |
| Image plane | (Light receiving surface) |  |  |  |

Aspherical coefficients

2nd surface k = −0.975, A4 = 3.12809e−05, A6 = 7.45185e−07, A8 = −9.67384e−08, A10 = 1.05534e−09
6th surface k = −0.332, A4 = 3.75509e−04, A6 = 2.61620e−05, A8 = 1.57443e−06, A10 = −4.77563e−08

Example 9 unit mm

Surface data

| Surface No | r | d | nd | vd |
| --- | --- | --- | --- | --- |
| 1 | −33.484 | 0.50 | 1.83400 | 37.16 |
| 2* | 5.595 | 1.42 |  |  |
| 3 | 11.010 | 2.00 | 2.00069 | 25.46 |
| 4 | 107.688 | Variable |  |  |
| 5 (S) | ∞ | −0.51 |  |  |
| 6* | 4.300 | 4.19 | 1.53113 | 55.30 |
| 7 | −9.020 | 0.10 |  |  |
| 8 | −14.233 | 0.70 | 1.84666 | 23.78 |
| 9* | 17.259 | 0.46 |  |  |
| 10 | ∞ | Variable |  |  |
| 11* | 50.115 | 2.44 | 1.53113 | 55.30 |
| 12* | 29.672 | Variable |  |  |
| 13 | ∞ | 0.50 | 1.51633 | 64.14 |
| 14 | ∞ | 0.50 |  |  |
| 15 | ∞ | 0.50 | 1.51633 | 64.14 |
| 16 | ∞ | 0.45 |  |  |
| Image plane | (Light receiving surface) |  |  |  |

Aspherical coefficients

2nd surface k = −1.070, A4 = 1.04782e−04, A6 = −9.42460e−07, A8 = −2.19062e−08, A10 = −1.45852e−10
6th surface k = −0.344, A4 = 2.04765e−04, A6 = 1.98087e−05, A8 = −6.19156e−07, A10 = −4.42940e−10

-continued unit mm

9th surface k = 0.000, A4 = 2.52512e−03, A6 = 1.87330e−04, A8 = −6.26204e−06,
A10 = 3.08865e−06
11th surface k = 0.000, A4 = 5.64501e−05, A6 = −1.07705e−05, A8 = 7.14900e−07
12th surface k = 0.000, A4 = 2.86668e−04, A6 = −8.42968e−05, A8 = 7.45066e−06,
A10 = −2.23480e−07

| Unit focal length | | |
|---|---|---|
| f1 = −13.69 | f2 = 10.56 | f3 = −142.87 |

| Zoom data | | | |
|---|---|---|---|
|  | WE | ST | TE |
| IH | 3.84 | 3.84 | 3.84 |
| focal length | 5.77 | 11.00 | 22.20 |
| Fno. | 3.04 | 4.05 | 6.00 |
| 2ω (°) | 76.37 | 39.15 | 19.75 |
| BF | 4.81 | 10.46 | 4.91 |
| Total length | 40.16 | 32.62 | 33.78 |
| d4 | 20.24 | 8.65 | 1.40 |
| d10 | 3.81 | 2.20 | 16.16 |
| d12 | 3.20 | 8.85 | 3.30 |

A zoom lens system of the tenth embodiment has a structure same as a structure of the zoom lens system of the seventh embodiment.

A zoom lens system of the eleventh embodiment has a structure same as a structure of the zoom lens system of the eighth embodiment.

A zoom lens system of the twelfth embodiment has a structure same as a structure of the zoom lens system of the ninth embodiment.

Example 10

Data of the image height and full-image angle in the tenth embodiment is shown below.

| Zoom data | | | |
|---|---|---|---|
|  | WE | ST | TE |
| IH | 3.57 | 3.84 | 3.84 |
| focal length | 5.77 | 11.00 | 22.20 |
| Fno. | 3.03 | 4.04 | 6.00 |
| 2ω (°) | 70.95 | 39.07 | 19.65 |

Example 11

Data of the image height and full-image angle in the eleventh embodiment is shown below.

| Zoom data | | | |
|---|---|---|---|
|  | WE | ST | TE |
| IH | 3.57 | 3.84 | 3.84 |
| focal length | 5.77 | 11.00 | 22.20 |
| Fno. | 3.02 | 4.05 | 6.00 |
| 2ω (°) | 70.92 | 39.03 | 19.67 |

Example 12

Data of the image height and full-image angle in the twelfth embodiment is shown below.

| Zoom data | | | |
|---|---|---|---|
|  | WE | ST | TE |
| IH | 3.57 | 3.84 | 3.84 |
| focal length | 5.77 | 11.00 | 22.20 |
| Fno. | 3.04 | 4.05 | 6.00 |
| 2ω (°) | 70.93 | 39.15 | 19.75 |

Aberration diagrams at the time of infinite object point focusing of the embodiments from the first embodiment to the third embodiment, and the embodiments from the seventh embodiment to the ninth embodiment are shown in FIG. 7A to FIG. 12C. In these aberration diagrams, FIG. 7A, FIG. 8A, FIG. 9A, FIG. 10A, FIG. 11A, and FIG. 12A show a spherical aberration (SA), an astigmatism (AS), a distortion (DT), and a chromatic aberration of magnification (CC) respectively, at the wide angle end, FIG. 7B, FIG. 8B, FIG. 9B, FIG. 10B, FIG. 11B, and FIG. 12B show a spherical aberration, an astigmatism, a distortion, and a chromatic aberration of magnification respectively, at the intermediate focal length state, and FIG. 7C, FIG. 8C, FIG. 9C, FIG. 10C, FIG. 11C, and FIG. 12C show a spherical aberration, an astigmatism, a distortion, and a chromatic aberration of magnification at the telephoto end. In each diagram, 'ω' shows a half image angle.

Data of the conditional expressions (1) to (10) according to each of embodiments are shown below.

|  | Example 1 | Example 2 | Example 3 |
|---|---|---|---|
| (1) $f_t/f_w$ | 3.85 | 3.85 | 3.85 |
| (2) $D_{L21}/D_t$ | 0.107 | 0.121 | 0.126 |
| (3) $D_w/(IH_{wt} \times f_t/f_w)$ | 2.64 | 2.66 | 2.68 |
| (4) $D_t/(IH_t \times f_t/f_w)$ | 2.57 | 2.53 | 2.49 |
| (5) $f_{G2}/f_w$ | 1.95 | 1.92 | 1.88 |
| (6) $(r_{L21f} + r_{L21r})/(r_{L21f} - r_{L21r})$ | −0.41 | −0.46 | −0.42 |
| (7) Pc | 200 nm | 200 nm | 200 nm |
| (8) Hc/Pc | 5.0 | 5.0 | 5.0 |
| (9) $d_{L21}$ | 1.53113 | 1.53113 | 1.53113 |
| (10) $vnd_{L21}$ | 55.30 | 55.30 | 55.30 |

|  | Example 4 | Example 5 | Example 6 |
|---|---|---|---|
| (1) $f_t/f_w$ | 3.85 | 3.85 | 3.85 |
| (2) $D_{L21}/D_t$ | 0.107 | 0.121 | 0.126 |
| (3) $D_w/(IH_{wt} \times f_t/f_w)$ | 2.84 | 2.86 | 2.88 |
| (4) $D_t/(IH_t \times f_t/f_w)$ | 2.57 | 2.53 | 2.49 |
| (5) $f_{G2}/f_w$ | 1.95 | 1.92 | 1.88 |
| (6) $(r_{L21f} + r_{L21r})/(r_{L21f} - r_{L21r})$ | −0.41 | −0.46 | −0.42 |

-continued

|  | | | |
|---|---|---|---|
| (7) Pc | 200 nm | 200 nm | 200 nm |
| (8) Hc/Pc | 5.0 | 5.0 | 5.0 |
| (9) $nd_{L21}$ | 1.53113 | 1.53113 | 1.53113 |
| (10) $vd_{L21}$ | 55.30 | 55.30 | 55.30 |

|  | Example 7 | Example 8 | Example 9 |
|---|---|---|---|
| (1) $f_t/f_w$ | 3.85 | 3.85 | 3.85 |
| (2) $D_{L21}/D_t$ | 0.125 | 0.123 | 0.123 |
| (3) $D_w/(IH_w \times f_t/f_w)$ | 2.70 | 2.70 | 2.70 |
| (4) $D_t/(IH_w \times f_t/f_w)$ | 2.26 | 2.31 | 2.31 |
| (5) $f_{G2}/f_w$ | 1.79 | 1.82 | 1.83 |
| (6) $(r_{L21f}+r_{L21r})/(r_{L21f}-r_{L21r})$ | −0.33 | −0.32 | −0.35 |
| (7) Pc | 200 nm | 200 nm | 200 nm |
| (8) Hc/Pc | 5.0 | 5.0 | 5.0 |
| (9) $nd_{L21}$ | 1.53113 | 1.53113 | 1.53113 |
| (10) $vd_{L21}$ | 55.30 | 55.30 | 55.30 |

|  | Example 10 | Example 11 | Example 12 |
|---|---|---|---|
| (1) $f_t/f_w$ | 3.85 | 3.85 | 3.85 |
| (2) $D_{L21}/D_t$ | 0.125 | 0.123 | 0.123 |
| (3) $D_w/(IH_w \times f_t/f_w)$ | 2.91 | 2.95 | 2.95 |
| (4) $D_t/(IH_w \times f_t/f_w)$ | 2.26 | 2.31 | 2.31 |
| (5) $f_{G2}/f_w$ | 1.79 | 1.82 | 1.83 |
| (6) $(r_{L21f}+r_{L21r})/(r_{L21f}-r_{L21r})$ | −0.33 | −0.32 | −0.35 |
| (7) Pc | 200 nm | 200 nm | 200 nm |
| (8) Hc/Pc | 5.0 | 5.0 | 5.0 |
| (9) $nd_{L21}$ | 1.53113 | 1.53113 | 1.53113 |
| (10) $vd_{L21}$ | 55.30 | 55.30 | 55.30 |

Incidentally, for preventing the occurrence of the ghost and the flare, generally, the antireflection coating is applied to a surface of a lens in contact with air.

On the other hand, at a cemented surface of a cemented lens, a refractive index of an adhesive is sufficiently higher than a refractive index of air. Therefore, in many cases, a reflectance is originally of the level of a single-layer coating, or lower, and the coating is applied in few cases. However, when the antireflection coating is applied positively even to the cemented surface, it is possible to reduce further the ghost and the flare, and to achieve a more favorable image.

Particularly, recently, a glass material having a high refractive index has been widely used in an optical system of cameras, for having a high effect on the aberration correction. However, when the glass material having a high refractive index is used as a cemented lens, a reflection at the cemented surface becomes unignorable. In such a case, applying the antireflection coating on the cemented surface is particularly effective.

An effective usage of the cemented surface coating has been disclosed in Japanese Patent Application Laid-open Publication No. Hei 2-27301, No. 2001-324676, No. 2005-92115, and U.S. Pat. No. 7,116,482. In these patent literatures, a cemented lens surface coating in a first lens unit of a positive preceding zoom lens system has been described, and the same as disclosed in these patent literatures may be implemented for the cemented lens surface in the first lens unit having a positive power, of the present invention.

As a coating material to be used, according to a refractive index of the adhesive material and a refractive index of the lens which is a base, coating materials such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ having a comparatively higher refractive index, and coating materials such as $MgF_2$, $SiO_2$, and $Al_2O_3$ having a comparatively lower refractive index may be selected appropriately, and set to a film thickness which satisfies phase conditions.

Naturally, similar to the coating on the surface of the lens in contact with air, the coating on the cemented surface may also be let to be a multi layer coating. By combining appropriately a film thickness and a coating material of number of films not less than in two layers, it is possible to reduce further the reflectance, and to control spectral characteristics and angular characteristics.

Moreover, it is needless to mention that for the cemented surface of lenses other than the lenses in the first lens unit, it is effective to apply the coating on the cemented surface based on a similar idea.

(Correction of Distortion)

Incidentally, when the zoom lens system of the present invention is used, a digital correction of distortion of an image is carried out electrically. A basic concept for the digital correction of the distortion of an image will be described below.

Figure 13:
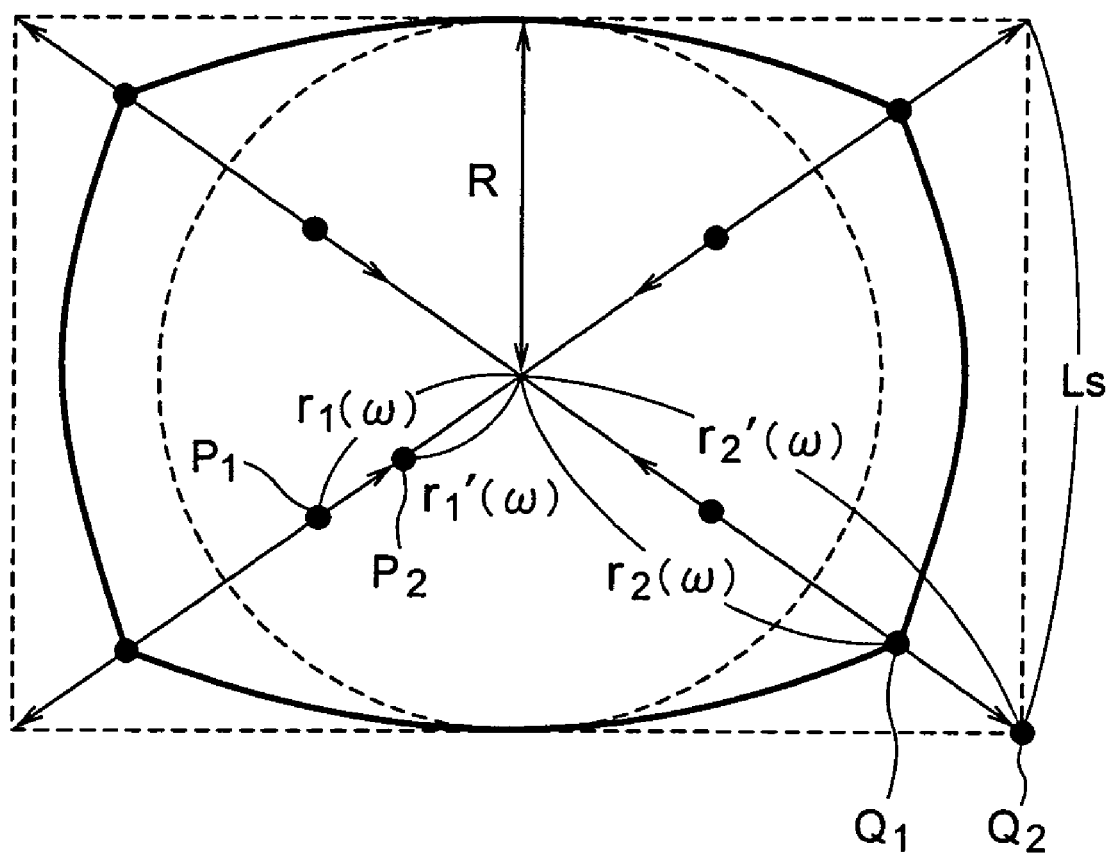
FIG. 13 is a diagram describing a correction of distortion.

For example, as shown in FIG. 13, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius r(ω) other than the radius R is moved in a substantial direction of radiation, and the correction is carried out by moving on a concentric circle such that the radius becomes r'(ω).

For example, in FIG. 13, a point $P_1$ on a circumference of an arbitrary radius $r_1(ω)$ positioned at an inner side of a circle of radius R is moved to a point $P_2$ on a circumference of a radius $r_1'(ω)$ which is to be corrected, directed toward a center of the circle. Moreover, a point $Q_1$ on a circumference of an arbitrary radius $r_2(ω)$ positioned at an outer side of the circle of radius R is moved to a point $Q_2$ on a circumference of a radius $r_2'(ω)$ which is to be corrected, directed toward a direction away from the center of the circle.

Here, r'(ω) can be expressed as follows.

$$r'(ω) = α \cdot f \cdot \tan ω (0 \leq α \leq 1)$$

where, ω is a half image angle of an object and f is a focal length of an imaging optical system (the zoom lens system in the present invention).

Here, when an ideal image height corresponding to a circle (image height) of radius R is let to be Y, then $$α = R/Y = R/(f \tan ω).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius r(ω) other than the radius R in a substantial direction of radiation, and moving on a concentric circle such that the radius becomes r'(ω), it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount r'(ω)−r(ω), an arrangement may be made such that a relationship between r(ω), in other words, half image angle and the image height, or a relationship between a real image height r and an ideal image height r'/α is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6Ls$$

where, Ls is a length of a short side of the effective image pickup surface.

It is preferable that the radius R satisfies the following conditional expression.

$$0.3Ls \leq R \leq 0.6Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha \cdot f \cdot \tan \omega$$

near a telephoto end in the focal point zones which are divided.

However, in this case, at a wide angle end in the focal point zones which are divided, a barrel-shape distortion at the wide angle end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega) = \alpha \cdot f \cdot \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f = y/\tan \omega$$

holds.

Here, y denotes a height (image height) of an image point from the optical axis, f denotes a focal length of an imaging system (zoom lens system in the present invention), and ω denotes an angle (object half image angle) with respect to the optical axis in an object point direction corresponding to image points connecting from a center on an image pickup plane up to a position of y.

When there is a barrel-shape distortion in the imaging system, the relationship becomes $$f > y/\tan \omega.$$

In other words, when the focal length f of the imaging system, and the image height y are let to be fixed, a value of ω becomes large.

(Digital Camera)

Figure 14:
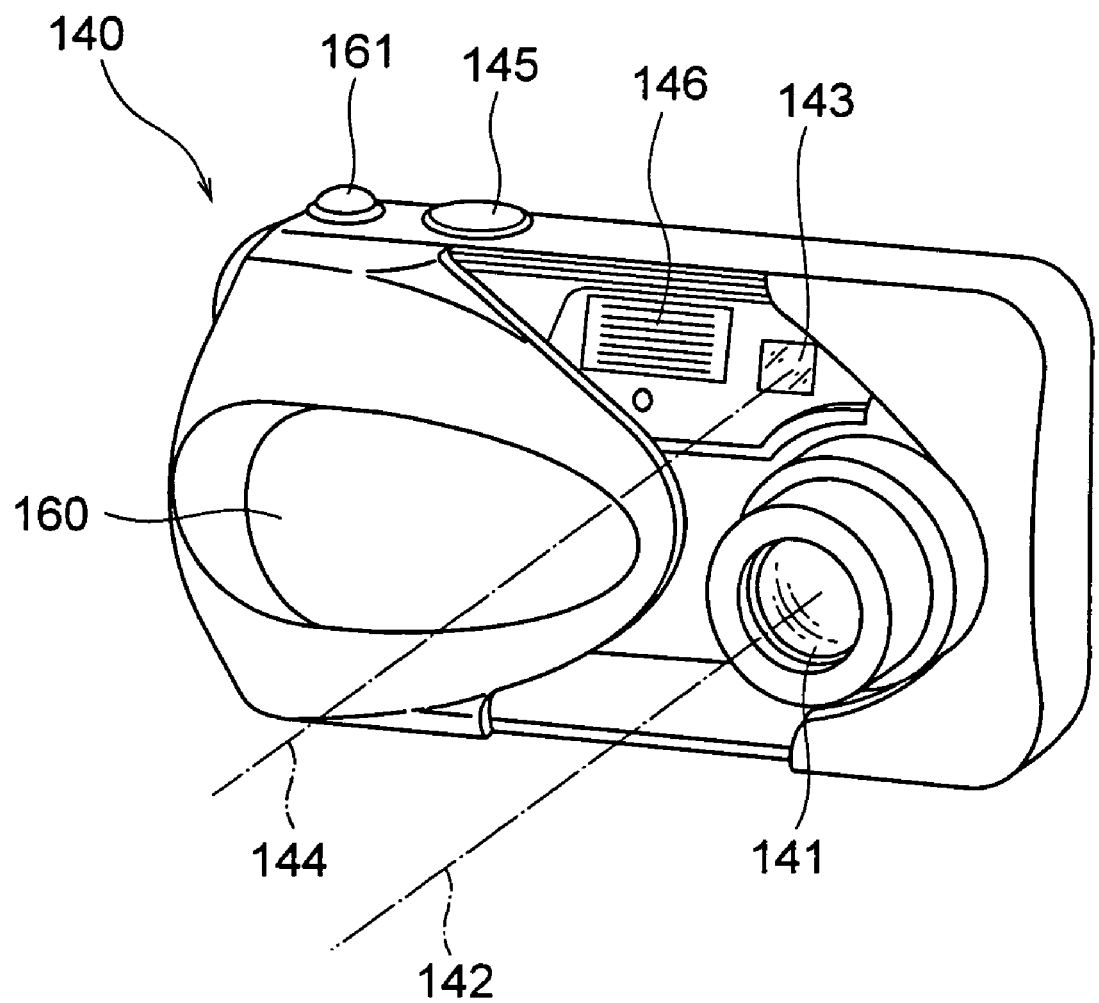
FIG. 14 is a front perspective view showing an appearance of a digital camera in which, the zoom lens system according to the present invention is incorporated.
Figure 15:
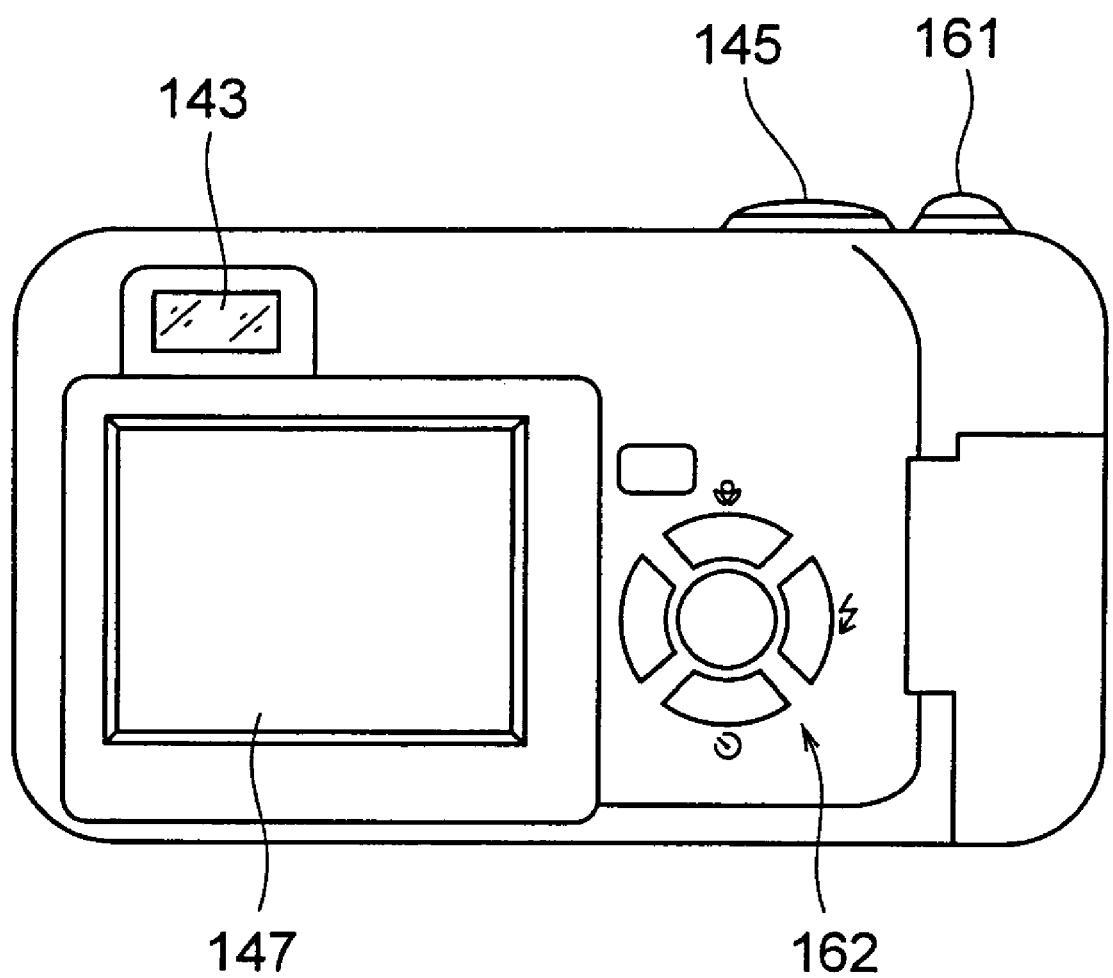
FIG. 15 is a rear perspective view of the digital camera in FIG. 14.
Figure 16:
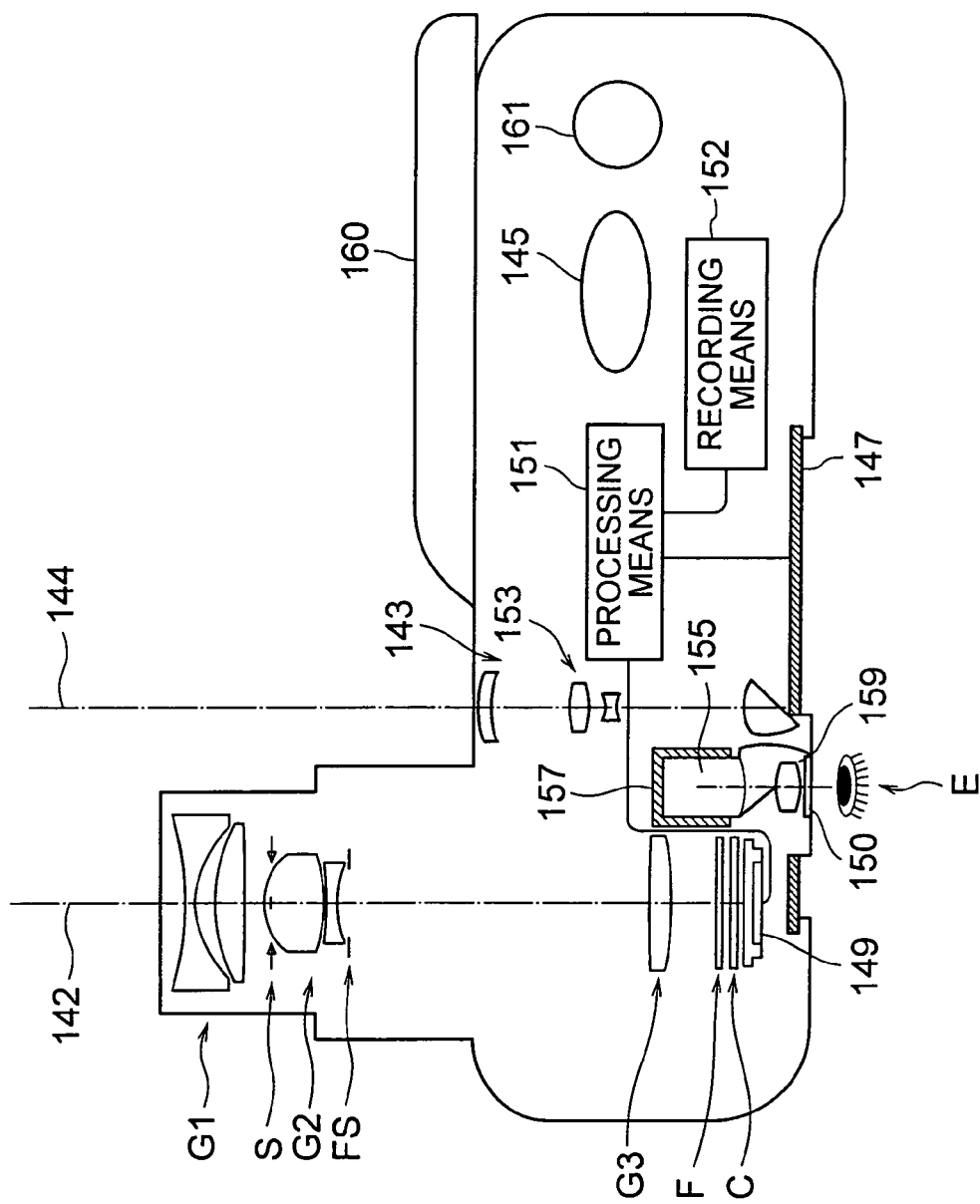
FIG. 16 is a cross-sectional view of the digital camera in FIG. 14.

FIG. 14 to FIG. 16 are conceptual diagrams of a structure of a digital camera according to the present invention in which a zoom lens system described above is incorporated in a taking optical system 141. FIG. 14 is a front perspective view showing an appearance of a digital camera 140, FIG. 15 is a rear perspective view of the same, and FIG. 16 is a schematic cross-sectional view showing a structure of the digital camera 140. In FIG. 14 and FIG. 16, show an uncollapsed state of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover is opened and the digital camera is set in a photo taking state, the taking optical system 141 assumes the uncollapsed state as shown in FIG. 14, when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. The finder objective optical system 153 consists of a plurality of lens units (three units in the diagram), and two prisms, and is made of a zoom optical system in which a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has an extremely small thickness in collapsed state, and an extremely stable imaging performance in the entire zooming region at high magnification, it is possible to realize a high-performance, a small size, and a widening of angle.

(Internal Circuit Structure)

Figure 17:
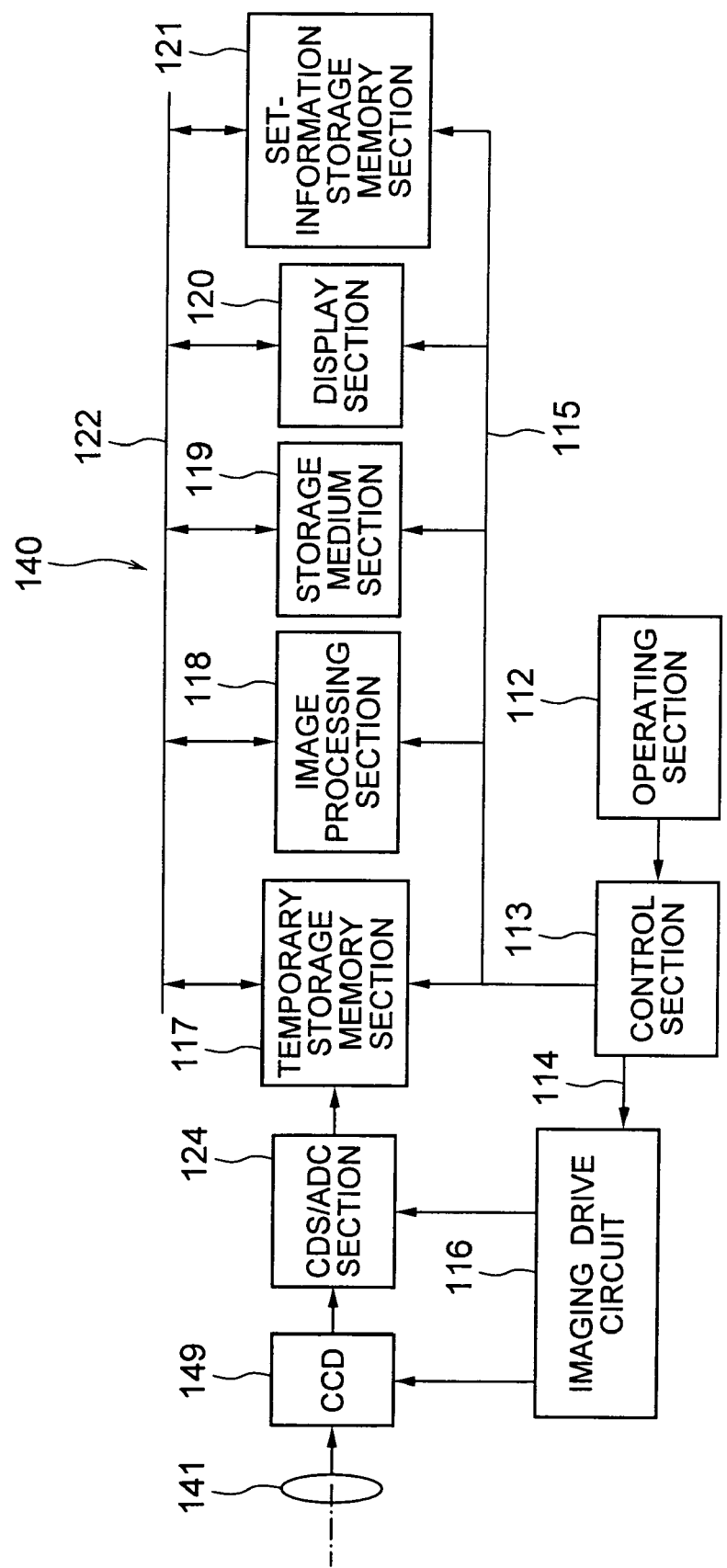
FIG. 17 is a structural block diagram of an internal circuit of main components of a digital camera.

FIG. 17 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 17, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

Moreover, it is preferable that the three-unit zoom lens system, in addition to one of the abovementioned (aspects of the) present invention, simultaneously satisfies arrangements in one of the following supplementary items.

(Supplementary Item 1)

A zoom lens system comprising a lens having a plurality of protrusions arranged two-dimensionally at a cycle shorter than 400 nm.

(Supplementary Item 2)

The zoom lens system according to the supplementary item 1 in which the plurality of protrusions satisfy the following conditional expressions.

$$20 \text{ nm} < Pc < 400 \text{ nm} \tag{7}$$

$$1.0 < Hc/Pc < 20.0 \tag{8}$$

where,

Pc denotes a pitch between the protrusions, and

Hc denotes a height of the protrusion.

(Supplementary Item 3)

The zoom lens system according to one of supplementary items 1 and 2, comprising an aperture stop adjacent to the lens.

(Supplementary Item 4)

The zoom lens system according to one of supplementary items 1, 2, and 3, in which, the lens is a plastic lens.

As it has been described above, the three-unit zoom lens system according to the present invention is appropriate as a zoom lens system which is advantageous for securing the high zooming ratio, and making the size small and light, and which is useful for securing easily the optical performance.

There is shown an effect that it is possible to provide a zoom lens system which is advantageous for securing the high zooming ratio, and reducing the cost, and which can easily secure the favorable optical performance, and an image pickup apparatus which includes such zoom lens system.

What is claimed is:

1. A three-unit zoom lens system comprising in order from an object side thereof:

a first lens unit having a negative refracting power;
a second lens unit having a positive refracting power;
a third lens unit having one of a positive refracting power and a negative refracting power; and
an aperture stop which is disposed at an image plane side of the first lens unit, and at an object side of a lens surface nearest to the image, of the second lens unit, and which moves integrally with the second lens unit, wherein at the time of zooming from a wide angle end to a telephoto end, a distance between the first lens unit and the second lens unit is narrowed, and a distance between the second lens unit and the third lens unit changes, and the second lens unit moves toward the object side at the time of zooming from the wide angle end to the telephoto end, and the second lens unit comprises a positive lens made of plastic, which is disposed nearest to the object, and the three-unit zoom lens system satisfies the following conditional expressions $$f_t/f_w > 3.6 \quad (1)$$

$$D_{L21}/D_t > 0.1 \quad (2)$$

where, $f_w$ denotes a focal length at the wide angle end, of the three-unit zoom lens system, $f_t$ denotes a focal length at the telephoto end, of the three-unit zoom lens system, $D_{L21}$ denotes an optical axial thickness of the positive lens made of plastic disposed nearest to the object in the second lens unit, and $D_t$ denotes an overall optical axial length at the wide angle end, of the three-unit zoom lens system, and the overall length is a length which is obtained by adding a back focus expressed in terms of an air conversion length, to an optical axial thickness from a surface of incidence of a lens nearest to the object up to a surface of emergence of a lens nearest to the image, of the three-unit zoom lens system.

2. The three-unit zoom lens system according to claim 1, wherein the third lens unit moves to a position of increasing magnification at the telephoto end with respect to the wide angle end.

3. The three-unit zoom lens system according to claim 1, wherein the three-unit zoom lens system satisfies the following conditional expressions $$1.0 < D_w/(IH_w \times f_t/f_w) < 3.5 \quad (3)$$

$$1.0 < D_t/(IH_w \times f_t/f_w) < 2.85 \quad (4)$$

where, $IH_w$ denotes an image height at the wide angle end, and
$D_w$ denotes the overall optical axial length at the telephoto end of the zoom lens system.

4. The three-unit zoom lens system according to claim 1, wherein the three-unit zoom lens system satisfies the following conditional expression $$1.3 < f_{G2}/f_w < 2.5 \quad (5)$$

where, $f_{G2}$ is a focal length of the second lens unit.

5. The three-unit zoom lens system according to claim 1, wherein the positive lens made of plastic in the second lens unit is a biconvex positive lens which satisfies the following conditional expression $$-0.8 < (r_{L21f} + r_{L21r})/(r_{L21f} - r_{L21r}) < 0 \quad (6)$$

where, $r_{L21f}$ denotes a paraxial radius of curvature of a surface on the object side of the positive lens made of plastic nearest to the object in the second lens unit, and $r_{L21r}$ denotes a paraxial radius of curvature of a surface on the image side of the positive lens made of plastic nearest to the object in the second lens unit.

6. The three-unit zoom lens system according to claim 1, wherein the total number of lenses in the three-unit zoom lens system is five.

7. The three-unit zoom lens system according to claim 1, wherein the total number of lenses in the third lens unit is one.

8. The three-unit zoom lens system according to claim 6, wherein the first lens unit comprises in order from the object side thereof, a negative lens and a positive lens, and
the total number of lenses in the first lens unit is two, and
the second lens unit comprises in order from the object side thereof, the positive lens made of plastic and a negative lens, and
the total number of lenses in the second lens unit is two, and
the third lens unit comprises a lens having one of a positive refracting power and a negative refracting power, and
the total number of lenses in the third lens unit is one, and
an Abbe's number of the positive lens in the first lens unit and the negative lens in the second lens unit, is smaller than an Abbe's number of the negative lens in the first lens unit, the positive lens made of plastic in the second lens unit, and the lens in the third lens unit.

9. The three-unit zoom lens system according to claim 6, wherein the each lens in the three-unit zoom lens system is a single lens.

10. The three-unit zoom lens system according to claim 1, wherein a proportion of the plastic lenses in each of the lenses in the three-unit zoom lens system is 40% and more.

11. The three-unit zoom lens system according to claim 1, wherein both lens surfaces namely, a lens surface nearest to the object and a lens surface nearest to the image in the second lens unit are aspheric surfaces.

12. The three-unit zoom lens system according to claim 1, wherein one of the lenses in the three-unit zoom lens system has a plurality of protrusions which are arranged two-dimensionally at a cycle shorter than 400 nm.

13. The three-unit zoom lens system according to claim 1, wherein
   the third lens unit has a positive refracting power, and is positioned at the image side at the telephoto end, with respect to the wide angle end, and
   a focusing from an object at a long distance to an object at a short distance is carried out by moving the third lens unit toward the object side.

14. The three-unit zoom lens system according to claim 1, wherein
   the third lens unit has a negative refracting power, and is positioned on the object side at the telephoto end with respect to the wide angle end, and
   a focusing from a long distance object to a short distance object is carried out by moving the third lens unit toward the image side.

15. The three-unit zoom lens system according to claim 1, wherein the positive lens made of plastic in the second lens unit satisfies the following conditional expressions $$1.40 < nd_{L21} < 1.55 \quad (9)$$

$$45 < vd_{L21} < 75 \quad (10)$$

where,
$nd_{L21}$ denotes a refractive index with respect to a d-line, of the positive lens made of plastic nearest to the object, in the second lens unit, and
$vd_{L21}$ denotes an Abbe's number of the positive lens made of plastic nearest to the object, in the second lens unit.

16. An image pickup apparatus comprising:
   a three-unit zoom lens system; and
   an image pickup element which is disposed at an image side of the three-unit zoom lens system, and which converts an optical image formed by the three-unit zoom lens system, to an electric signal, wherein
   the three-unit zoom lens system is a zoom lens system according t claim 1.

17. The image pickup apparatus according to claim 16, comprising:
   an image conversion section which converts the electric signal including a distortion due to the three-unit zoom lens system, to an image signal in which, the distortion is corrected by an image processing.

* * * * *